US009541231B1

(12) United States Patent
Owens

(10) Patent No.: US 9,541,231 B1
(45) Date of Patent: Jan. 10, 2017

(54) FRAME SUPPORT FOR CREATING AND DISPLAYING HANDMADE PAPER CRAFTS

(71) Applicant: Celena Misshola Owens, Baltimore, MD (US)

(72) Inventor: Celena Misshola Owens, Baltimore, MD (US)

( * ) Notice: Subject to any disclaimer, the term of this patent is extended or adjusted under 35 U.S.C. 154(b) by 0 days.

(21) Appl. No.: 14/312,638

(22) Filed: Jun. 23, 2014

Related U.S. Application Data

(60) Provisional application No. 61/838,271, filed on Jun. 22, 2013, provisional application No. 61/843,409, filed on Jul. 7, 2013, provisional application No. 61/979,498, filed on Apr. 14, 2014.

(51) Int. Cl.

| | |
|---|---|
| ***F16M 11/22*** | (2006.01) |
| ***F21V 35/00*** | (2006.01) |
| ***F21V 19/00*** | (2006.01) |
| *F21W 121/00* | (2006.01) |
| *F21Y 101/02* | (2006.01) |

(52) U.S. Cl.
CPC ........... *F16M 11/22* (2013.01); *F21V 19/0015* (2013.01); *F21V 35/003* (2013.01); *F21W 2121/00* (2013.01); *F21Y 2101/02* (2013.01)

(58) Field of Classification Search
None
See application file for complete search history.

(56) References Cited

U.S. PATENT DOCUMENTS

| | | | | |
|---|---|---|---|---|
| 176,894 A * | 5/1876 | Sherwood et al. | A47B 73/00 211/181.1 |
| 25,574 A | 6/1896 | Wright | |
| 1,113,371 A | 10/1914 | Pajeau | |
| 1,865,453 A | 7/1932 | Baltzley | |
| 1,889,669 A * | 11/1932 | Knipe | A47G 7/041 211/85.23 |
| 2,014,175 A | 9/1935 | Hart | |
| 2,140,743 A * | 12/1938 | Heymann | A47G 23/0208 211/74 |

(Continued)

FOREIGN PATENT DOCUMENTS

| | | |
|---|---|---|
| CN | 201251093 Y | 6/2009 |
| DE | 102012111927 B3 | 12/2013 |

(Continued)

OTHER PUBLICATIONS

Yamaguchi, Machine Translation for JP 2002319302 A, Oct. 2002.*

(Continued)

*Primary Examiner* — Charlie Y Peng
(74) *Attorney, Agent, or Firm* — Michael Antone

(57) ABSTRACT

A frame and frame assembly for paper crafts and paper lanterns that is used to create handmade paper lanterns. Paper or similar material can be secured at various elevations along the frame enabling a variety styles and the ability to incorporate embellishments like small vases and bottles with the paper decoration. A frame assembly that has detachable members that can be used to create a variety of different configurations of lantern frames. Additional embodiments, such as a cage attachment is used to make the frame or frame assembly larger, to accommodate larger paper sizes or fabric. A magnet can be used with all embodiments to attach and/or secure a tea light or LED tea light to frame, to keep it secure.

22 Claims, 18 Drawing Sheets

(56) References Cited

U.S. PATENT DOCUMENTS 2,224,950 A * 12/1940 Burke ........ F21V 1/00 362/358
2,604,288 A 7/1952 Koch
2,746,823 A 5/1956 Sand
2,767,757 A 10/1956 Marder
2,768,044 A 10/1956 Jaffe
2,791,391 A * 5/1957 Uphoff ........ A47G 7/041 248/150
2,850,826 A 9/1958 Testa
2,892,074 A * 6/1959 O'Morrow ........ F21V 21/0824 362/122
2,937,761 A 5/1960 Reed
D189,683 S * 1/1961 Bloomfield ........ D7/501
3,013,758 A * 12/1961 Smith ........ A47G 7/025 206/423
3,091,106 A * 5/1963 Crouch ........ F21V 35/00 431/154
3,099,357 A 7/1963 Harris
3,202,192 A 8/1965 Henschel
3,263,355 A 8/1966 March
3,279,118 A * 10/1966 Allen ........ A01M 1/2088 128/203.12
3,481,075 A 12/1969 Dastoli
4,008,670 A 2/1977 Price
4,041,881 A 8/1977 Textaris
4,186,430 A * 1/1980 Britton ........ F21V 35/00 362/161
4,354,222 A * 10/1982 Gall ........ F21V 1/06 362/352
4,413,800 A 11/1983 Kelson
4,731,715 A * 3/1988 Anderson ........ F21V 1/26 362/352
4,903,923 A 2/1990 Krentel
4,914,857 A 4/1990 Dodgen
5,034,868 A * 7/1991 Stelfox ........ F21V 15/01 362/352
5,121,312 A * 6/1992 Hyland ........ F21V 1/14 362/352
5,178,454 A * 1/1993 Lai ........ F21V 21/116 362/153
5,179,799 A 1/1993 Hillestad
5,307,598 A * 5/1994 West ........ A47G 29/1216 232/39
5,311,415 A * 5/1994 Hyland ........ F21V 1/06 362/352
5,474,843 A * 12/1995 Lambert ........ B41M 5/5245 347/105
D378,145 S 2/1997 Cohon
D390,754 S * 2/1998 Bank ........ D6/405
5,746,506 A * 5/1998 Dunbar ........ F21V 1/06 362/351
5,784,972 A 7/1998 Emalfarb
5,850,927 A * 12/1998 Pan ........ A63H 3/04 211/181.1
6,089,726 A * 7/2000 Eldridge, Jr. ........ F04D 29/582 219/220
6,279,762 B1 8/2001 Buchalter
6,321,921 B1 11/2001 Massoudnia
6,364,258 B1 4/2002 Naranjo
D461,331 S * 8/2002 Glaubitz ........ D6/404
6,474,843 B2 * 11/2002 Shieh ........ B44C 5/00 362/227
D474,072 S * 5/2003 Tseng ........ D7/505
6,579,578 B1 6/2003 Lai
D504,789 S 5/2005 Hayes
D517,717 S * 3/2006 Sanoner ........ D26/68
7,296,773 B2 11/2007 Yang
D571,615 S * 6/2008 Talbot ........ D7/558
7,943,211 B2 * 5/2011 Chen ........ A47G 33/06 362/121
8,122,691 B2 2/2012 Weader
8,136,786 B2 * 3/2012 Kepes ........ A47B 97/08 248/166
8,356,926 B1 * 1/2013 Sanders ........ A63H 27/10 362/249.15
8,613,527 B1 * 12/2013 Allen ........ F21V 3/026 362/234
8,931,192 B2 * 1/2015 Acworth ........ 362/351
8,998,473 B1 * 4/2015 Anderson ........ A01G 7/045 362/253
2003/0033750 A1 * 2/2003 Gunderman ........ A47G 7/025 47/45
2003/0054644 A1 * 3/2003 Patel ........ B24B 49/02 438/689
2003/0067765 A1 * 4/2003 Li ........ A45B 3/04 362/102
2004/0130899 A1 * 7/2004 Skouras ........ B44C 5/005 362/351
2005/0145760 A1 * 7/2005 Bower ........ A47G 7/041 248/146
2005/0146882 A1 * 7/2005 Liao ........ F21V 17/007 362/352
2007/0183143 A1 * 8/2007 Allsop ........ F21S 9/037 362/183
2007/0274071 A1 * 11/2007 Smith ........ B44C 5/005 362/249.16
2008/0086931 A1 * 4/2008 Liao ........ A01M 1/106 43/107
2008/0089065 A1 * 4/2008 Li ........ B44F 1/10 362/249.16
2009/0206046 A1 * 8/2009 Lunato ........ A01G 9/02 211/85.18
2010/0254160 A1 * 10/2010 Chan ........ A47G 33/06 362/653
2010/0291500 A1 * 11/2010 Barrett ........ A47G 33/00 431/292
2011/0007507 A1 * 1/2011 Braasch ........ 362/249.1
2012/0044683 A1 * 2/2012 Tong ........ F21S 4/15 362/249.01
2012/0112012 A1 * 5/2012 Jackson ........ A47G 7/02 248/27.8
2013/0139434 A1 * 6/2013 Warren ........ A01G 9/12 47/44
2015/0053685 A1 * 2/2015 Sievers ........ A63K 1/00 220/485
2015/0077980 A1 * 3/2015 Coughlin ........ F21V 21/14 362/183

FOREIGN PATENT DOCUMENTS

EP 0745205 A1 12/1996
JP 2002319302 A * 10/2002
WO 2008060224 A1 5/2008

OTHER PUBLICATIONS

AMACO, Online catalog: http://www.amaco.com, "WireFrame Wire Forms", Feb. 2013 to present, at time of filing.
Paper Moon Weddings, http://www.polkadotbride.com/2013/05/diy-paper-lanterns-tutorial/, May 2013.

* cited by examiner

Paper
23
24
24
Vase

Paper
24
23
Vase

Paper
23
24
Vase

FRAME SUPPORT FOR CREATING AND DISPLAYING HANDMADE PAPER CRAFTS

CROSS REFERENCE TO RELATED APPLICATIONS

This application claims the benefit of provisional patent application Ser. No. 61/838,271, filed 2013 Jun. 22; 61/843,409 filed 2013 Jul. 7; and 61/979,498 filed 2014 Apr. 14, and non provisional patent application Ser No. 14/312,638, filed 2014 Jun. 23 by the present inventor.

FEDERALLY SPONSORED RESEARCH

Not Applicable.

SEQUENCE LISTING, ETC ON CD

Not Applicable.

BACKGROUND

Prior Art

The following is a tabulation of some prior art that presently appears relevant:

| U.S. Patents | | | |
|---|---|---|---|
| Patent Number | Kind Code | Issue Date | Patentee |
| 1,865,453 | A | 1932 Jul. 5 | Louis Baltzley |

| U.S. Pat. application Publications | | | |
|---|---|---|---|
| Publication No. | Kind Code | Publ. Date | Applicant |
| 20050145760 | A1 | 2005 Jul. 7 | Necia Bower, Peter Heller |

| Foreign Patent Document | | | | |
|---|---|---|---|---|
| Foreign Doc. No. | Cntry Code | Kind Code | Pub. Dt | App or Patentee |
| 102062303 | CN | A | 2011 May 18 | — |
| 201251093 | CN | Y | 2009 Jun. 03 | — |
| 102012111927 | DE | B3 | 2013 Dec. 24 | Patentinhaber Gleich |

NONPATENT LITERATURE DOCUMENTS

Amaco, www.AMACO.com, "WireFrames Wire Forms" (2013-2014)

Paper Moon Weddings, http:/www.polkadotbride.com/2013/05/diy-paper-lanterns-tutorial/, (May 2013)

Description of Related Art

Paper lanterns have been in existence throughout history. Most lanterns are manufactured and sold with the paper permanently adhered to the frame using glue or a similar adhesive. Paper lanterns are typically used for decorative purposes for holidays, parties, weddings, etc. They are also often used in home decor. The antique and retro styled paper lanterns typically have multiple panels where individual pieces of paper are permanently attached to each panel. This style lantern is usually designed to maintain the same paper design throughout the life of the lantern. The problem is that if paper panels are damaged, they would have to be replaced professionally.

Currently, the most common paper lanterns used today for party decoration, are for example, in China patent 201,251, 093, (2009). The paper is glued to the frame and it comes with a plastic device that is used to hold open the flattened paper lantern, while in use. These lanterns may last for several uses, but they are fragile and have a very short life span. Once the paper becomes faded or is torn, the lantern is no longer usable and has to be discarded. Additionally, because these paper lanterns come in a specific permanent color, it may not be useful for subsequent events that have a different color scheme. This design is not configured to enable one to change out the paper, or to reuse the frame to simply create one's own lantern. There is also no provision to mount or stake these lanterns.

There are also the do-it-yourself (DIY) paper lanterns. These are made using a sheet of paper, adhesive or staples, and are typically suspended on a string. Although handmade paper centerpieces and paper lanterns are typically simple to do, putting them on display is much more cumbersome. These are flimsy and generally cannot stand erect on a table or on the ground. This flimsy nature makes the DIY decoration look homemade and unsophisticated. These handmade DIY lanterns do not have accommodations for a light source to be used, such as a tea light or an LED light. If it is desired that the paper lantern stands erect and on its own, there is the risk of it slouching for lack of support. Accommodations must then be made to create a support, such as using a jar, and the like, to use as a support for the paper lantern. In this case, one must go through great lengths to create or provide a frame for a handmade paper lantern. Cardstock paper can be used to create a sturdier paper lantern that may stand on its own, but the paper thickness may limit the emitting of light through the paper.

The configuration disclosed in China, Publication 102,062,303, (2011), describes a method for handmade lanterns using bamboo, rice paper, pen and ink. This however uses a specific type of paper, rice paper. The paper is glued to the frame creating a lantern where the paper is permanently affixed to the frame. This method is cumbersome and creates a lantern that has the paper permanently affixed to the frame, and cannot be disassembled for compact storage.

There is the WireFrames product sold online by AMACO in the year 2013 to present year (2014), http://www.amaco-.com, that was designed to enable the user to create for all types of craft projects which may include a picture frame, candle holder, etc., however; this device is flimsy and does not stand on its own. There are elastic cords provided to make the frame free standing, but these cords are not sturdy in its support, and are highly susceptible to breakage. This design requires that the user use crafting to provide a method to make the frame rigid and more stable. The frame is also too large to accommodate standard sized scrapbook paper and smaller. This frame does not enable the paper to be elevated at various points along the frame. This frame also does not provide a support for a candle or light source. If a light source is desired, the end user must make a support.

The above mentioned do not provide a way to create customized paper lanterns that can be infinitely redesigned with minimal effort. These lanterns do not have interchangeable pieces that can create a variety of paper lantern frames.

BRIEF SUMMARY OF THE INVENTION

In accordance with one embodiment, a frame assembly comprising support members that are sloped particularly with a slight slope, that gradually extends outward from the top, detachable and interchangeable members that can be used to form different variations of a frame.

Advantages

Accordingly, several advantages of one or more aspects are as follows: to provide a frame or frame assembly for the creation of handmade lanterns, particularly paper lanterns for use with paper or fabric that is not permanently attached to the frame for infinite reuse; and to provide detachable support legs that vary in size and shape for even more versatility in style, the ability to swap out broken parts with new ones without having to replace entire assembly, solid structure that is sturdy and long lasting and relatively inexpensive.

DRAWINGS

Figures

Figure 4:
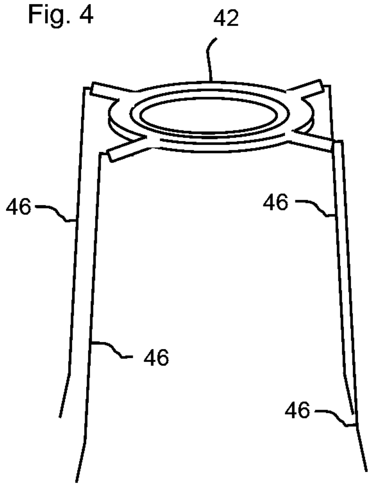
FIG. 4 is a second embodiment for a frame assembly, comprising of a plurality of members that are assembled to form a frame.
Figure 4A:
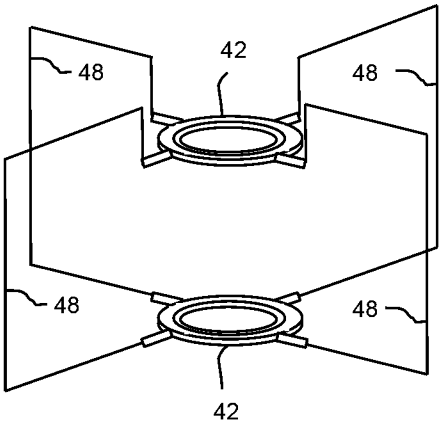
Figure 4B:
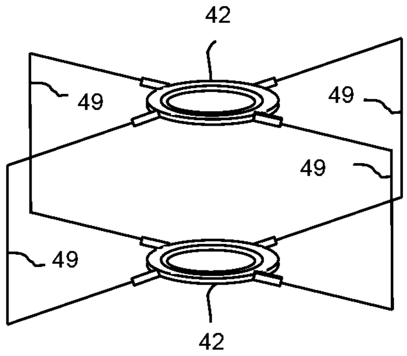
Figure 4C:
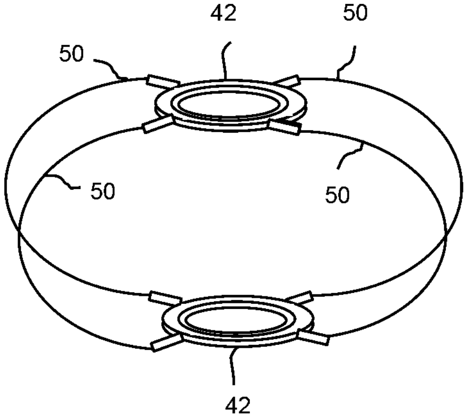

FIGS. 4A, 4B, and 4C are isometric views of alternative embodiments of frame assembly found in FIG. 4.

FIGS. 4D to 4I are various embodiments and views of connectors used in frame assembly.

FIGS. 4J to 4N are various views of alternative embodiments for frame assembly using various connector types.

Figure 4D:
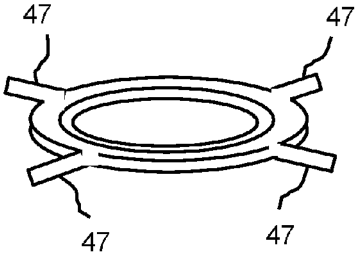
Figure 4E:
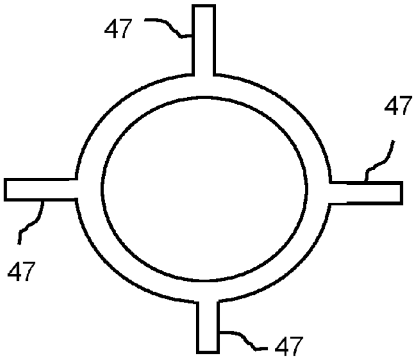
Figure 4F:
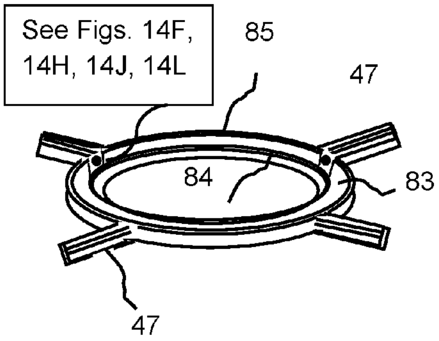
Figure 4G:
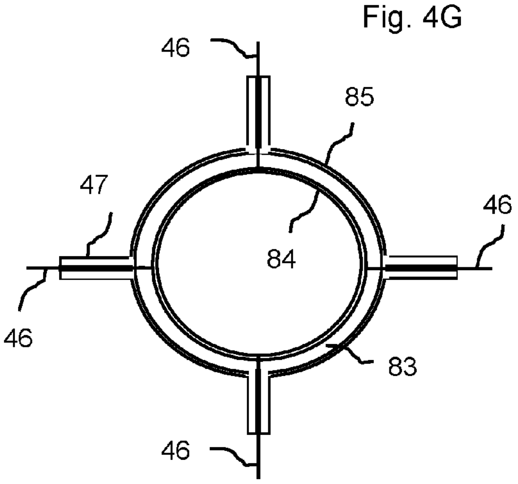
Figure 4H:
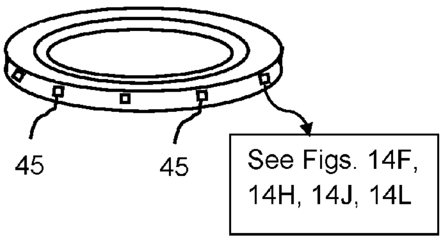
Figure 4I:
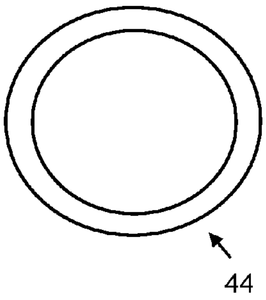
Figure 4J:
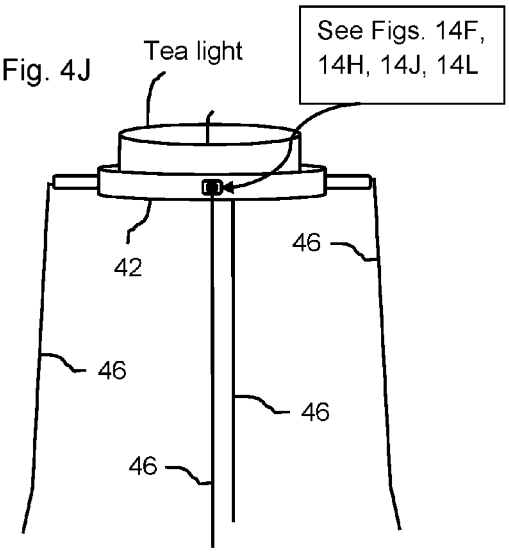
Figure 4K:
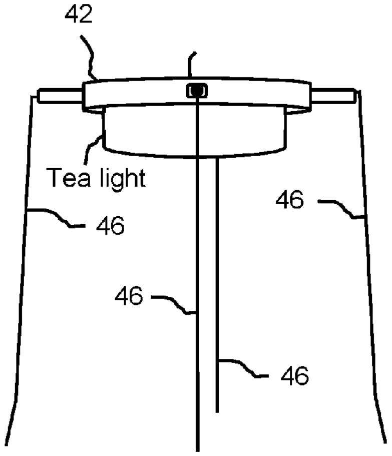
Figure 4L:
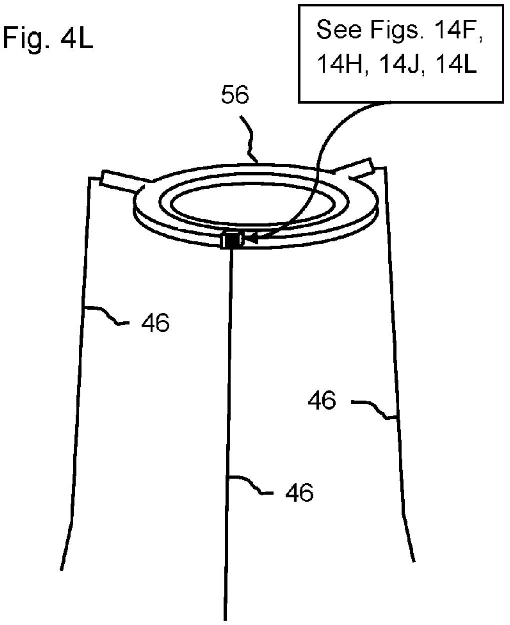
Figure 4M:
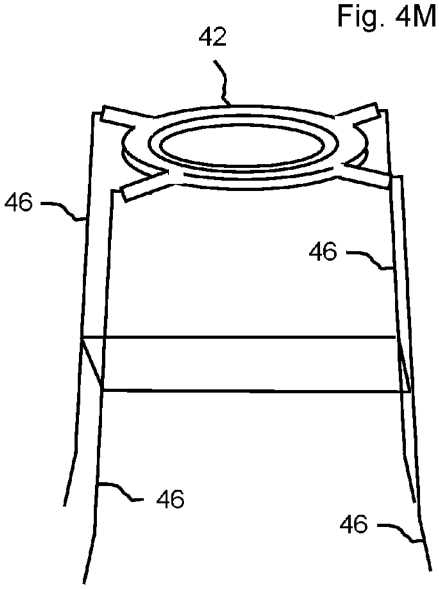
Figure 4N:
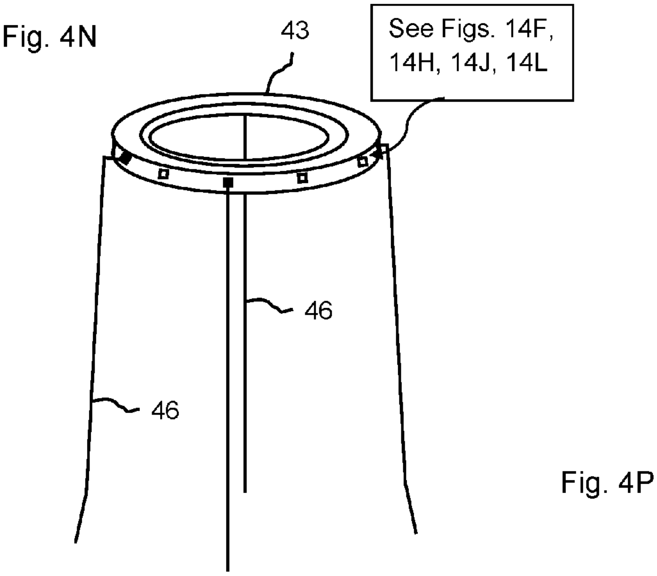
Figure 4O:
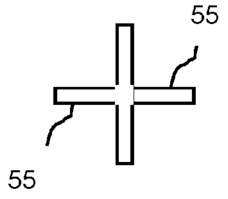
Figure 4P:
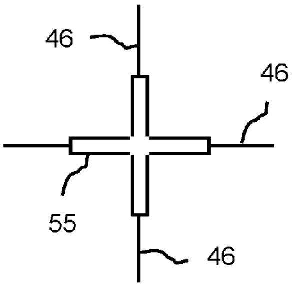
Figure 4Q:
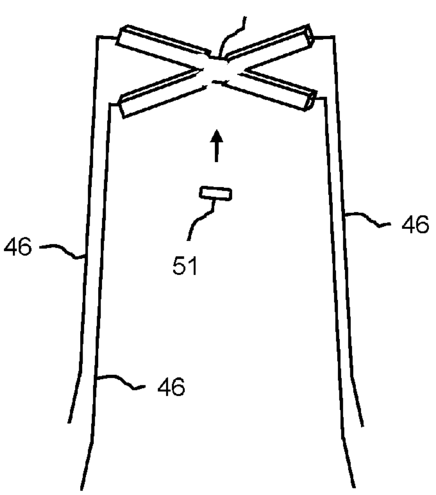

FIGS. 4O to 4Q are top and isometric views, respectively, of simple connector 44.

Figure 4R:
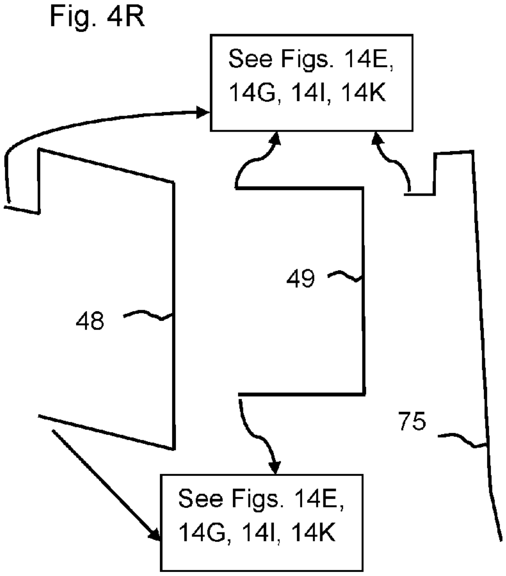

FIG. 4R contains alternative embodiments of detachable support legs.

Figure 4S:
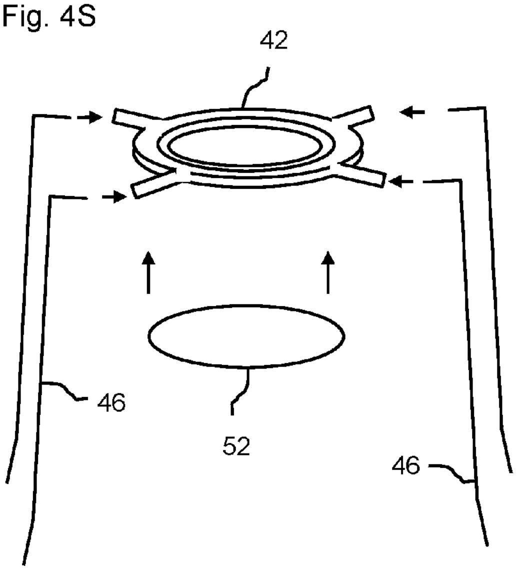
Figure 4T:
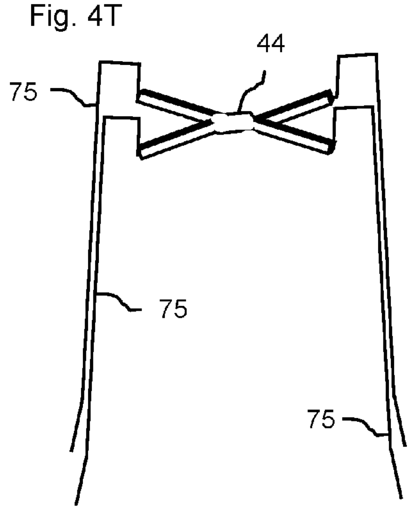

FIGS. 4S and 4T are views of additional configurations of frame assembly used with various optional components, including the use of a magnet.

Figure 4U:
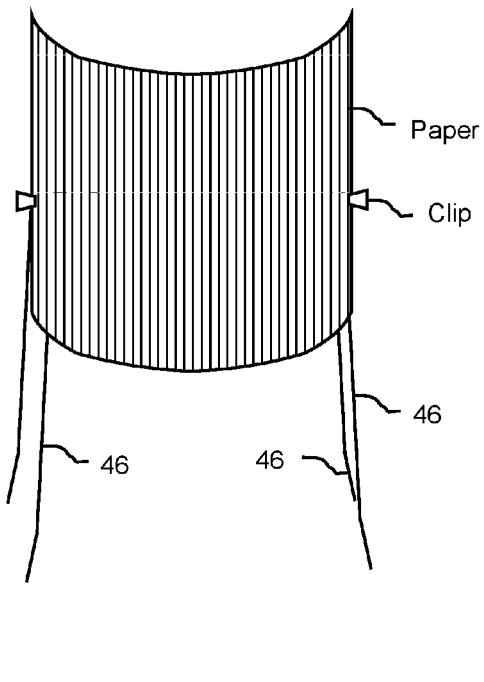
Figure 4V:
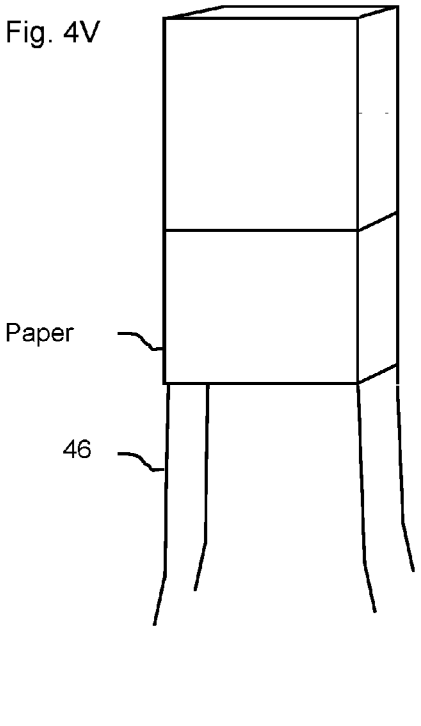

FIGS. 4U and 4V are isometric views of frame assembly, wrapped with paper, and secured with either a clip or with a rubber band.

Figure 4W:
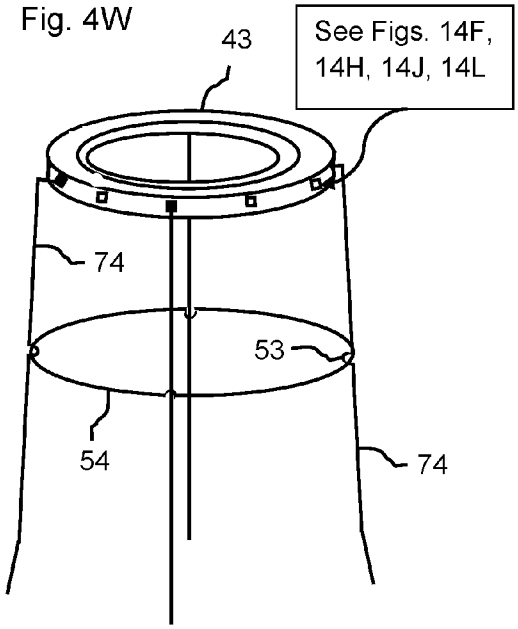

FIG. 4W is an isometric view of an alternative embodiment for frame assembly using an alternative configuration of detachable support components.

Figure 4X:
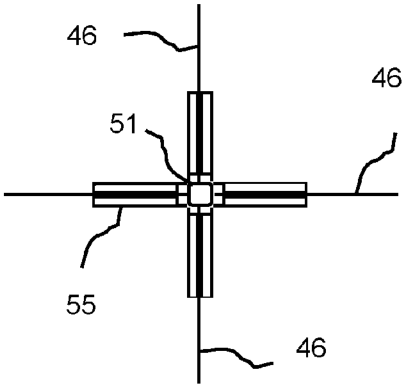
Figure 4Y:
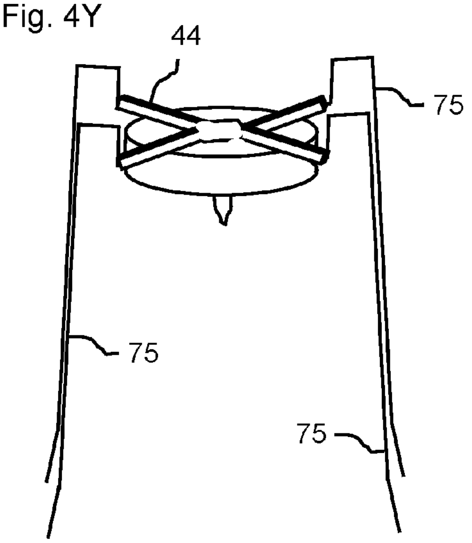

FIGS. 4X and 4Y are views of an alternative embodiment of a connector using in use with a magnet.

Figure 5:
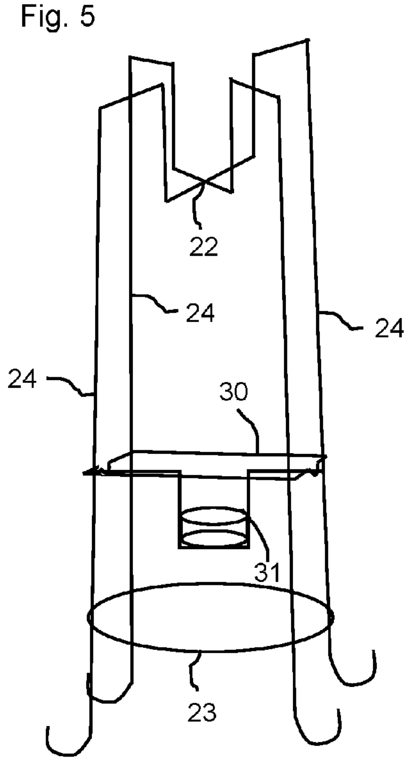
Figure 6:
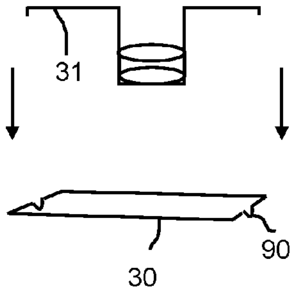

FIGS. 5 and 6 are isometric views of frame embodiment, and a device that will enable a tea light to be used at a lower level within the frame, as they would be used together.

Figure 7:
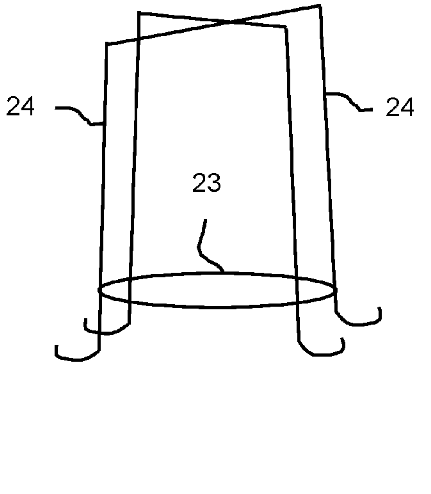

FIG. 7 is an isometric view of an alternative frame that is shorter and/or smaller to accommodate smaller paper sizes or craft materials.

Figure 8:
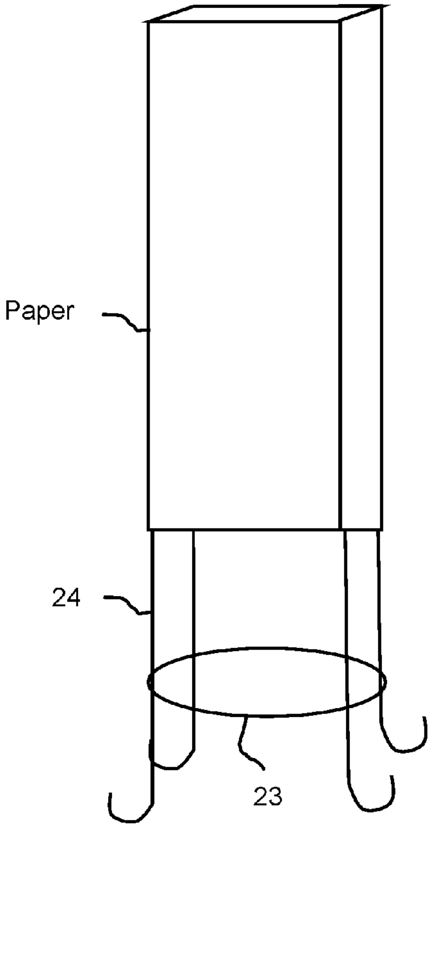

FIG. 8 is an isometric view of frame embodiment in use with standard size scrapbook paper that is tightened, fastened, and elevated on the frame.

FIGS. 9A to 9E demonstrate various cork toppers, used to provide a frame for paper displays above a corked bottle or vase in a manner that resembles a lamp shade.

FIGS. 10A to 10F are various views of a stake and mounting devices and how they would be used with frame embodiment.

FIGS. 11A to 11D are various views of an alternative frame embodiment and the additional components that can be used with it.

FIGS. 12A to 12D are various views of a lamp socket case and how it can be used with frame embodiment and lamp socket.

Figure 13A:
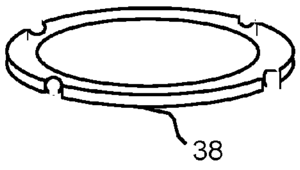
Figure 13B:
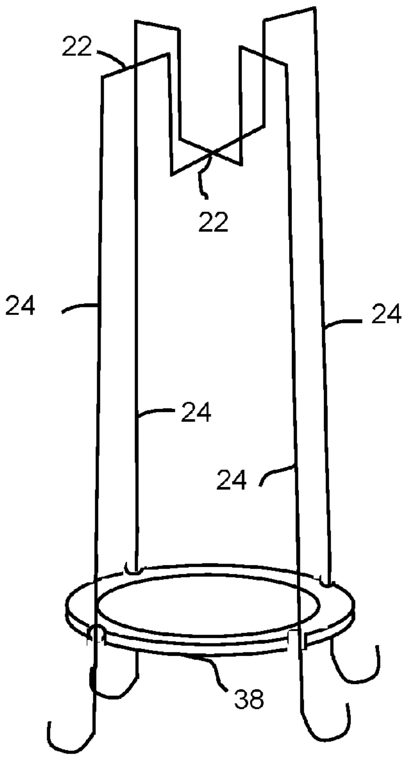

FIGS. 13A and 13B are various views of additional components that can be used with frame embodiment.

Figure 13C:
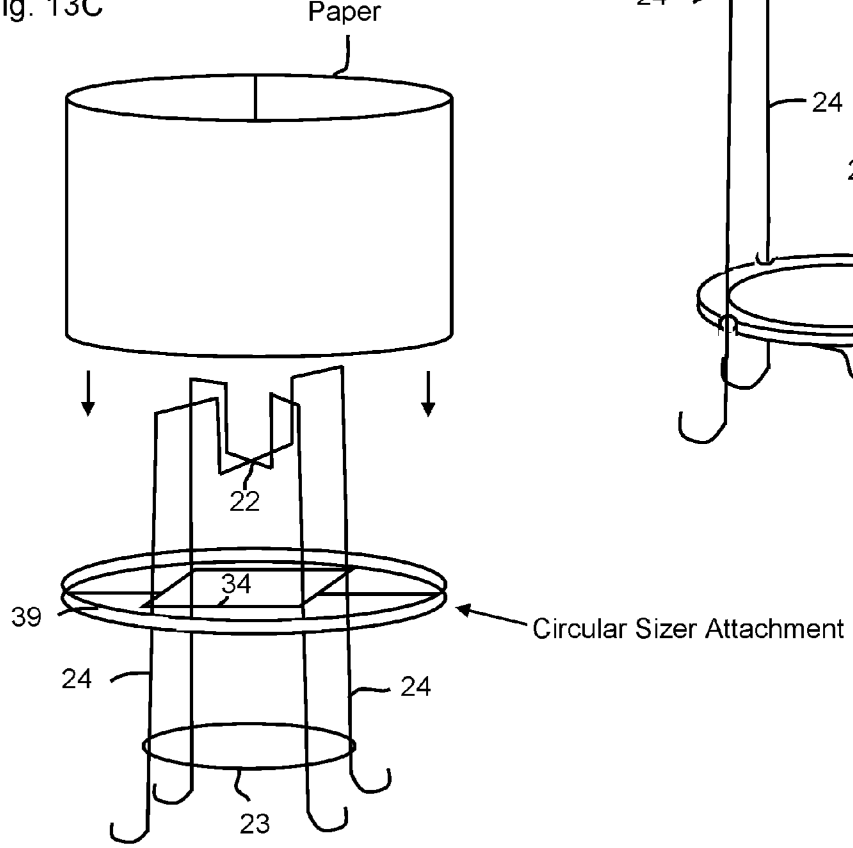

FIG. 13C is an exploded view of circular sizer attachment in use with frame embodiment, and larger sized paper material.

Figure 1:
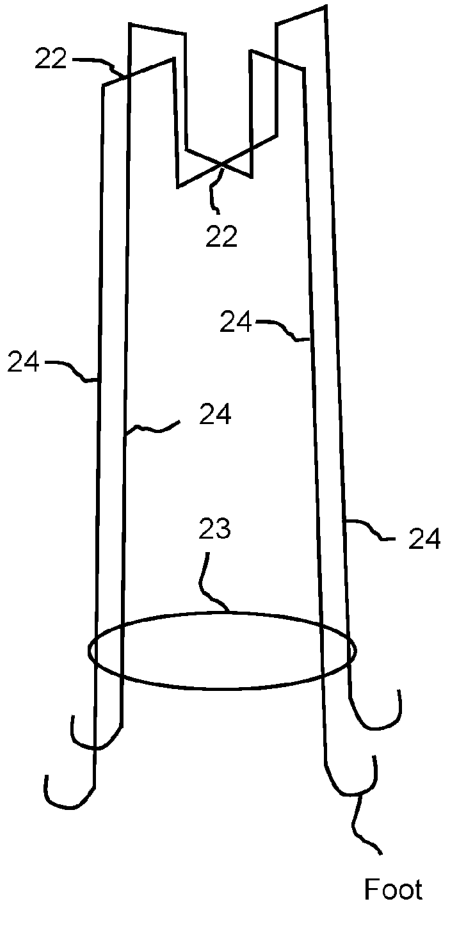
FIG. 1 is an isometric view of a frame embodiment that is used to create and display handmade paper centerpieces or handmade paper lanterns.
Figures 14A, 14B, 14C:
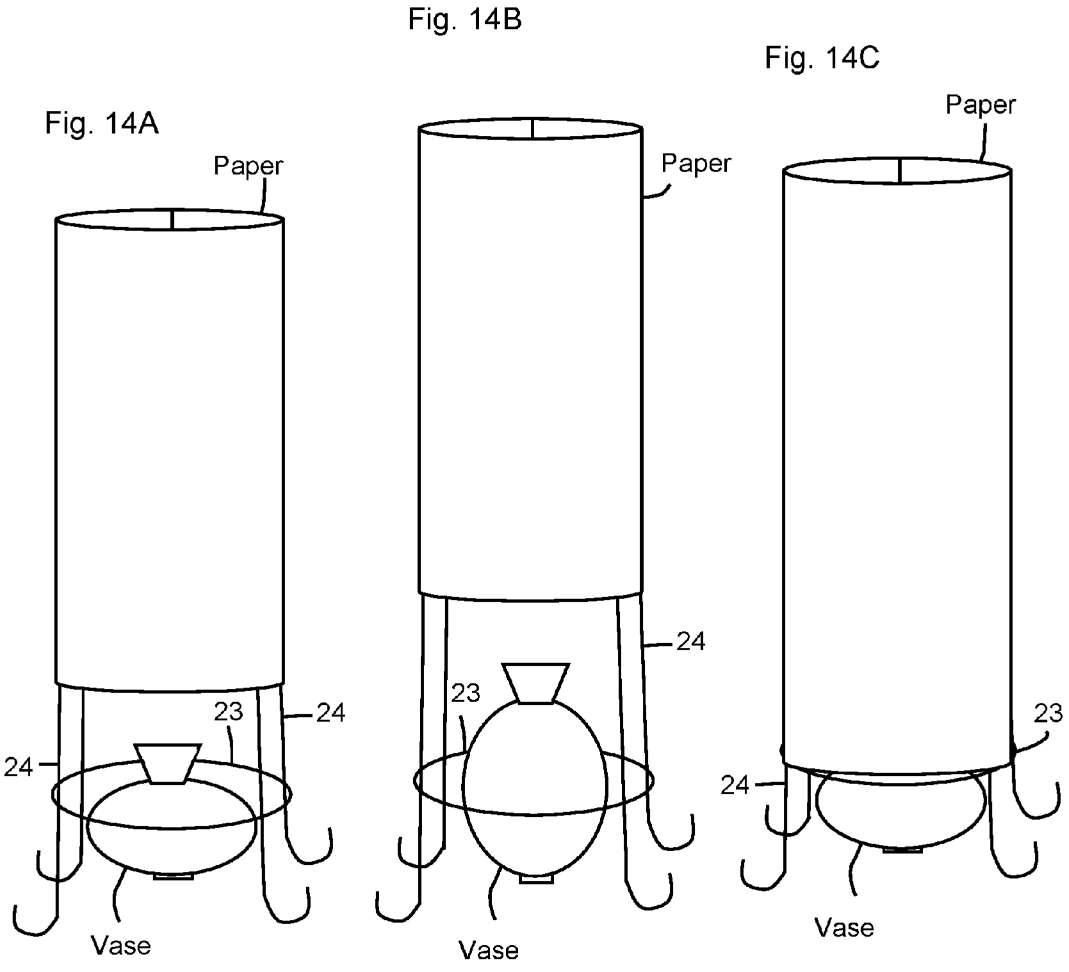

FIGS. 14A, 14B, and 14C are isometric views of frame embodiment in FIG. 1 that has paper secured at various elevations on the frame, in use with various sized vases.

FIGS. 14D to 14L are various shaped male and female plugs for the detachable support legs and the connectors.

Figure 15A:
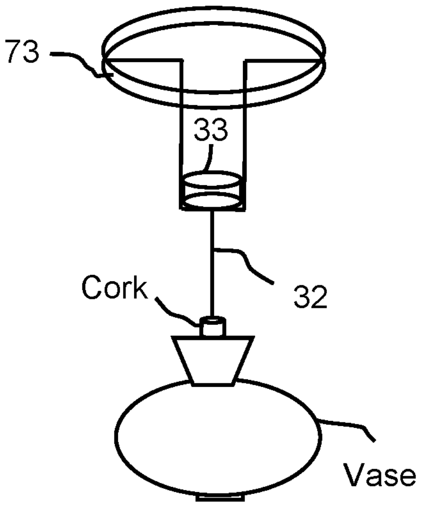
Figure 15B:
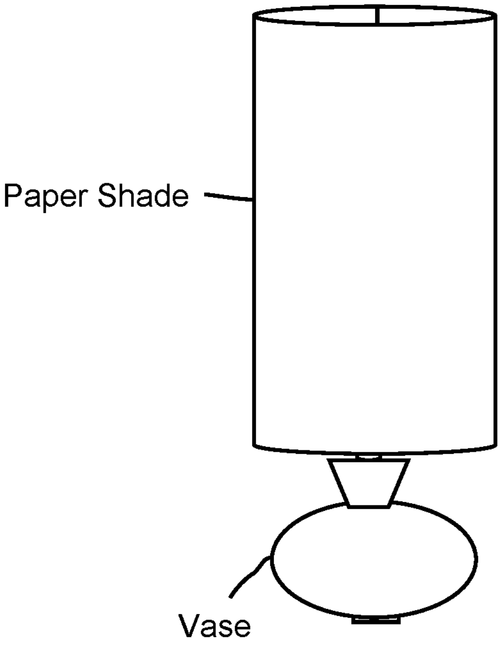

FIGS. 15A and 15B are isometric views of a cork frame, demonstrating its use with a corked vase and paper.

FIGS. 16A to 16E illustrate a third embodiment for frame assembly.

REFERENCE NUMERALS

22. post
23. base
24. vertical support member
25. leg stake
27. stake head
28. mount head
30. stopper
31. removable tea light holder
32. cork stake
33. tea light cup
34. attachment bracket
35. rim
36. cord slot
37. cup plate
38. lip
39. cage frame
40. cage frame
41. cage frame
42. flange connector
43. basic connector
44. simple connector
45. support holes
46. detachable support leg
47. flange
48. detachable support leg
49. detachable support leg
50. detachable support leg
51. magnet
52. magnet

53. belt notch
54. frame belt
55. flange
56. three flange connector
57. contour plug
58. frame body
59. frame body
70. square cork frame
71. square cork frame
72. circular cork frame
73. circular cork frame
74. detachable support leg
75. detachable support leg
76. detachable support leg
80. vase holder attachment
81. cup case
82. lamp socket case
83. conduit
84. inner rim
85. outer rim
86. round plug
87. extender connector
88. flange
89. leg spout
90. stem notch

DETAILED DESCRIPTION

Figure 2:
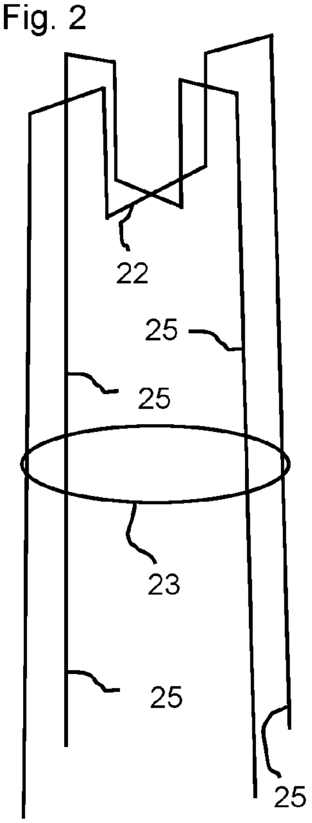
FIG. 2 is an alternative frame embodiment with vertical support members that are to be staked in the ground.

FIGS. 1-2—First Embodiment

Figure 1A:
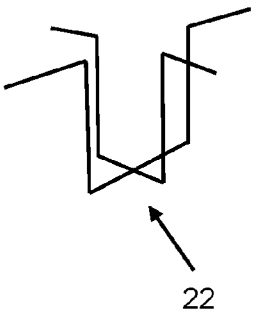
FIG. 1A is an isometric view of a post 22 that is used to house a tea light and also functions as a mounting or staking post.

FIG. 1 is an isometric view of a frame embodiment that is used to create and display handmade paper centerpieces or handmade paper lanterns. The frame is a self-standing and self-supported frame made of rigid metal wire that is welded together to form the frame. Although metal and/or metal wire are most desirable to use, any material that will produce similar results such as wood, plastic, etc. may also be suitable. The frame has a plurality of vertical and horizontal support members. Frame in FIG. 1 contains a plurality of horizontal and vertical members that connect at right angles at the top of the frame that intersect to form an open enclosure, a post 22, as seen in FIG. 1A. The horizontal support members of post 22 are connected to said vertical support members. Post 22 doubles as a tea light holder and a stake and mounting post. It is elongated in the center of the frame, in order to balance the frame when placed on a stake or mounting device. Post 22 comprises of a plurality of stems that connect at right angles that form an open enclosure just big enough to contain a tea light. This keeps the tea light or LED light from shifting or falling out of the post. Post 22 enables frame embodiment to be mounted or staked with or without the use of a tea light or LED light. Post 22/tea light holder is at the top of the frame enabling paper to be positioned at various elevations on the frame and can be used with various sized vases.

FIG. 2 is an alternative frame embodiment with a plurality of leg stakes 25 that are staked directly in the ground. This embodiment would most preferably be made of a flexible metal wire material.

Operation

FIGS. 1-2

In operation, one uses the frame embodiment in FIG. 1 as a support to contain and display handmade paper lanterns, comprising primarily of paper, fabric or any other desired material; however, it can also be used to create a variety of crafts such as a lamp, wind chime, night light, etc., using various materials such as wire, cloth, etc. The frame is designed to fit and accommodate standard scrapbook paper sizes, which come in 12"×12" and 8.5"×11", with minimal accommodations. Custom cut paper of various sizes may also be used. After forming and fastening the paper into a cylindrical shape, as with staples, metal clips, adhesive glue dots, etc., the paper is then slid onto the frame from the top and pulled down over it to the level desired. Depending on the inner diameter of the cylinder formed paper, the paper can be elevated at any point on the frame, high or low. Vertical support members 24, each having a foot at the bottom, would most preferably be made of a smooth cylindrical surface and are each sloped from top to bottom, gradually extending outward from the top, almost barely noticeable; making the frame slightly narrower at the top, and widens slightly as it reaches base 23. The slight slope creates a resistance that enables paper or similar material to be elevated, fastened, and secured at any location along the frame without any additional accommodations. The slighter the slope, the more points of elevation there are along the frame. Without the slope, the paper could easily slide down the frame below preferred location or elevation point, with little or no resistance due to gravity. When paper or similar material is tightened around vertical support members 24, the resistance created by the slope prohibits the paper from sliding down the frame below desired elevation point due to gravity, pulling, tugging, or when added embellishments are heavier than the paper.

With this frame embodiment, various shapes can be formed with the paper. For a cylindrical shape, the paper is formed into a cylinder, fastened temporarily with metal clips, and then pulled down over the frame until friction, caused by the slight slope, stops it. The clips can be adjusted to tighten or loosen the paper on the frame, until the desired elevation is reached. For a rectangular shape, like in FIG. 4V, the cylinder formed paper is pulled down over the frame, and then creased by pinching the edges along each vertical support member 24, while it is on the frame. This will crease the bottom half of the paper. The paper is then flipped, slid down onto the frame, and creases are repeated for the other half of the paper. Smaller paper sizes may be secured on the frame using clips or rubber bands to secure the paper to the frame. This embodiment may also accommodate endless possibilities and any other shapes that are conceived, such as a miniature hut, mini dollhouse, etc.

When the diameter of the cylinder formed from paper is slightly larger than the bottom of frame embodiment in FIG. 1, the paper or similar material will rest on base 23, creating an alternate effect that may be desired. Base 23 extends beyond the width of the frame in FIG. 1. Base 23 elevates the bottom of the paper or similar material above the feet of the frame and keeps the paper or similar material from sliding off of the frame. The frame in FIG. 1 may come in various sizes and widths from tall to short, and medium to narrow and may be constructed out of any suitable material that will produce a sturdy or rigid frame. Although metal and/or metal wire are most desirable to use, any material that will produce similar results such as wood, plastic, etc. may also be suitable. The frame in FIG. 1 contains a post 22 that will enable it to be mounted on a wall or wooden fence, elevated on a stake, suspended or hung. Post 22 is a multi-functional post that also functions as an enclosure to contain a lamp socket or a tea light.

FIG. 2 is an alternative frame embodiment with leg stakes 25 that can be staked in the ground. Each of the leg stakes 25 are inserted directly in the ground, to stake the frame embodiment containing the paper centerpiece or lantern. This embodiment would be preferably made of a rigid, but slightly flexible and light wire material; although, any suitable material and size that will provide similar results, will do.

FIGS. 3A-3E

Additional Embodiments

Figure 3A:
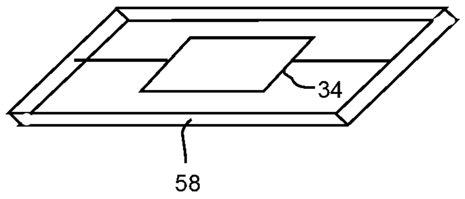
FIG. 3A is a square sizer attachment that accommodates larger sized paper or similar material for use with frame embodiment.
Figure 3B:
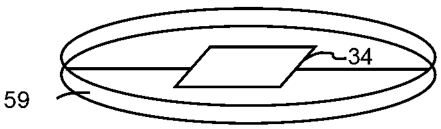
FIG. 3B is a circular sizer attachment that accommodates larger sized paper or similar material for use with frame embodiment.
Figure 3C:
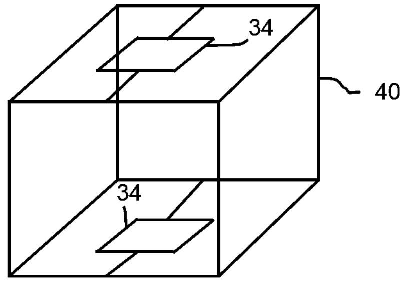
FIG. 3C is an isometric view of a square cage attachment that accommodates larger sized paper or similar material for use with frame embodiment.
Figure 3D:
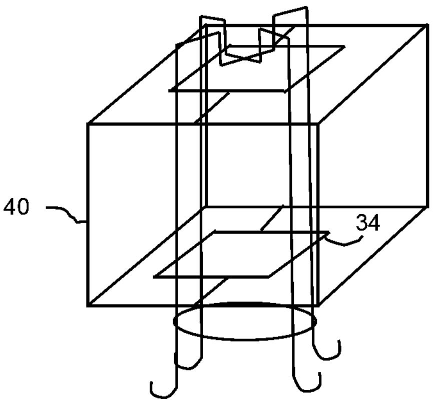
FIG. 3D is an isometric view of a square cage attachment and frame embodiment, in use with larger sized paper or similar material.
Figure 3E:
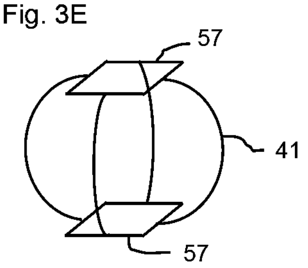
FIG. 3E is an isometric view of a round cage attachment that is placed onto frame embodiment, as it would be while in use with larger sized paper or other material.

FIGS. 3A and 3B are each sizer attachments that comprise of an attachment bracket 34 that fits over the body of frame embodiment. FIGS. 3C, 3D, and 3E are each sizer attachments that comprise of a plurality of attachment brackets 34 and 57 respectively, that fit over the body of frame embodiment. Sizer attachments would preferably be made of metal but any suitable sturdy and rigid material will do. When using metal wire, the sizer attachment is assembled by welding metal parts together. The wire gauge is of a thin but rigid material. FIGS. 3A and 3B each contain a frame body 58 and 59, respectively. These are both flat metal pieces that are each welded to a plurality of horizontal stems that are connected to attachment brackets 34.

Operation 3A-3E

FIGS. 3A and 3B are isometric views of sizer attachments. The sizer attachment is designed to slide over the body of frame embodiment from the top, via attachment bracket 34, and is elevated at a particular point on the frame. The inner diameter of attachment bracket 34 enables it to be secured at a particular elevation on the frame embodiment. Attachment bracket 34 on the sizer attachments may come in various inner diameter sizes, enabling it to be secured at various elevations on the frame embodiment. Once the sizer attachment is secured on the frame, paper or similar material is secured around the sizer attachment with double sided tape and by wrapping the paper in the desired style. A small piece of tape is needed to tape the first edge of the paper at the desired location to frame body 58 or 59. After taping, the paper is then pulled tightly around the frame, and then taped to the second edge of paper.

The sizer attachments are used to make the frame wider or of a different shape such as circular, square, triangular etc, as seen in FIGS. 3A, 3B, 3C, and 3E. The sizer attachment can also be used when creating a lamp in order that a greater distance is created between the shade made of paper, and the bulb. The sizer attachment most preferably would be made of metal wire, but any suitable material that produce similar results, will do. FIGS. 3C, 3D, and 3E comprise of cage frames 40 and 41. These are designed to be used particularly with softer materials such as tissue paper, fabric, etc. where the material can be wrapped around the entire area of the cage frame, top and bottom, and the sides.

FIGS. 4-4Y

Second Embodiment

Figure 14D:
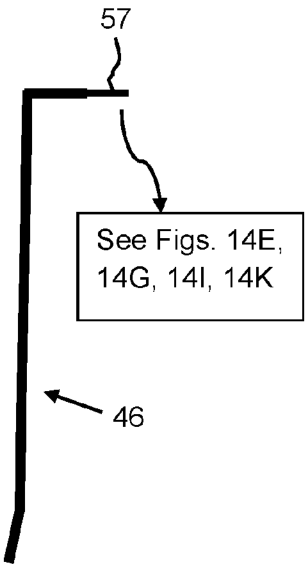
Figure 14E:
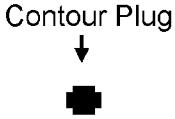
Figure 14F:
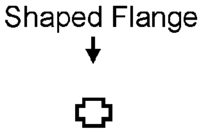
Figure 14G:
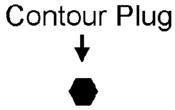
Figure 14H:
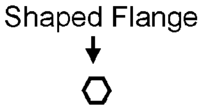
Figure 14I:
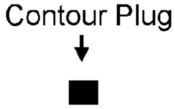
Figure 14J:
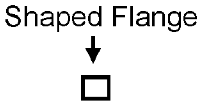
Figure 14K:
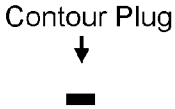
Figure 14L:
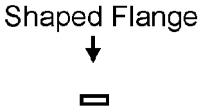

FIG. 4 is a second embodiment of a frame assembly comprising of a flange connector 42 and a plurality of detachable support legs 46, joined together to form a frame. Flange connector 42 contains a plurality of flanges 47, also seen in FIG. 4D, that extend out from the perimeter of the connector. The hollow center of flange 47 has a particular shape, which has at least one side, and comprises of a square, hexagon, octagon, flat, cross, etc. Detachable support leg 46 has an end, a contour plug 57 that plugs into flange 47 of connector 42. Contour plug 57 is the top horizontal portion of detachable support leg 46 that plugs directly into flange 47, as seen in FIG. 14D, going the majority of the way inside the flange. Contour plug 57 has a shaped end that corresponds with the hollow center of the flange, which comprises of a square, hexagon, octagon, flat, cross, etc. Detachable leg 46, preferably having a smooth cylindrical surface, comprised of contour plug 57, would most preferably be made of a light-rigid metal wire, although any suitable material will do. The frame assembly in this embodiment is made of a thinner wire, than that of the wire of frame embodiment in FIG. 1.

Each of a detachable support leg 48, 49, 50, 74, and 75 are most preferably made of a light-rigid metal wire, although any suitable material will do. The detachable support legs are made of a thinner wire, than that of the wire of frame embodiment in FIG. 1. The support legs would most preferably be made of a smooth cylindrical surface with one or more ends comprising of at least one shaped end, contour plug 57. Contour plug 57 is cut or molded out of the metal to produce the shaped end of the detachable support leg. Detachable support legs 48, 49 and 50 each have two ends that comprise of contour plug 57. In this case, multiple connectors would be needed to assemble the frame. The connectors may also be made of any suitable material that will produce similar results, such as plastic, wood, etc. However, it is most preferred to use a resilient material, such as spring steel, that will enable the flanges of the connector to grab and hold the detachable support legs when in use; and spring back to its original position when the support legs are detached from the connector.

FIGS. 4A, 4B, and 4C are isometric views of alternative embodiments of frame assembly found in FIG. 4. Each figure illustrates various sizes and shapes of detachable support legs that can be used with a connector.

FIGS. 4D, 4E, 4F, 4G, 4H, and 4I demonstrate connectors 42 and 43, each having an open circular center that is lined with an inner rim 84. An outer rim 85 is on the perimeter of the connector and extends upward, a little higher than inner rim 84. Conduit 83 is positioned between inner rim 84 and outer rim 85, forming a concave shape between the two rims. The connectors are made by cutting out a flat piece of thin metal and then formed. Flanges 47 and each of a flange 55, as seen in FIG. 4O, protrude from the connector and is folded over and formed into an enclosure that will encase the contour plugs comprising of contour plug 55 of the detachable support leg. Basic connector 43 has a plurality of support holes 45 that are cut or punched out of metal, and may comprise of various shapes, which have at least one side. These shapes may comprise of a square, hexagon, octagon, flat, cross, etc.

FIG. 4J is a frontal view of frame assembly with a tea light placed on top of flange connector 42 when it is in a face up position, such as in FIGS. 4F and 4G. Outer rim 85 extends upward, a little higher than inner rim 84 to secure the tea light and to keep it from sliding off. FIG. 4K is a frontal view of frame assembly that demonstrates a tea light suspended or mounted on the underside of the connector.

FIG. 4L is an alternative embodiment of frame assembly with a three flange connector 56. It has 3 flanges, in order to create a triangular shaped frame. FIG. 4M is an isometric view of frame assembly being secured with a rubber band. FIGS. 4N and 4W are isometric views of frame assembly using basic connector 43 with detachable support legs 46, and each of a detachable support leg 74, respectively.

Detachable support legs 74 in FIG. 4W contain a belt notch 53 for use with a frame belt 54. It is most preferred that frame belt 54 be made of metal wire, but any suitable material will do, that produce similar results.

FIGS. 4O, 4P, 4Q, 4T, 4X, and 4Y include top and isometric views of a simple connector 44 in use with various detachable components such as detachable support legs 46 and 75, and a magnet 51. FIG. 4T is an isometric view of an alternative embodiment of frame assembly using simple connector 44 and detachable support legs 75. Detachable support members 75 are shaped to form an alternate embodiment of post 22 as seen in FIG. 1A. FIG. 4R demonstrates various detachable support legs that are unassembled, that can be used to create a frame. Detachable support legs 48, 49, and 75 are unassembled from the frame, as illustrated.

FIG. 4W is an isometric view of an alternative embodiment for frame assembly using basic connector 43, detachable support legs 74 with belt notch 53, and frame belt 54 that are all assembled to form the frame. Frame belt 54 slides down over frame and pops in to belt notch 53. The inner diameter of frame belt 54 being smaller than the width of the frame, along with the slope of detachable support legs 46 creates a tension that enables frame belt 54 to be held securely in place and to pop into belt notches 53.

Operation

FIGS. 4-4Y

The manner of assembling the frame assembly in FIG. 4 is to plug each contour plug 57, located at the top horizontal portion of detachable support leg 46, into each flange 47, as seen in FIG. 14D. Contour plug 57 has a shape that corresponds with the hollow center of flange 57. Contour plug 57 acts as the male plug, and flange 47 acts as the female plug. Once these are plugged in together, the frame is ready to use. The frame assembly can be used with standard scrapbook paper sizes, as well as custom cut paper of various sizes. After forming and fastening the paper into a cylindrical shape, as with staples, metal clips, adhesive glue dots, etc., the paper is then slid onto the frame from the top and pulled down over it to the level desired. The paper can be elevated at any point along the frame, high or low. Detachable support legs 46 are sloped, gradually extending outward from top to bottom, making the frame slightly narrower at the top, and widens slightly as it reaches the bottom. The slight slope creates a resistance that enables paper or similar material, to be elevated, fastened and secured at any location along the frame. The slighter the slope, the more points of elevation there are. Without the slope, the paper could easily slide down the frame below preferred location or elevation point, with little or no resistance due to gravity. When paper or similar material is tightened around detachable support legs 46, the resistance created by the slope prohibits the paper from sliding down the frame below desired elevation point due to gravity, pulling, tugging, or when added embellishments are heavier than the paper. Because the frame assembly will come in various sizes, even the smaller-mini-sized paper can be used with the frame assembly.

FIG. 4 is a second embodiment of a frame assembly comprising of a flange connector 42, and a plurality of detachable support legs 46 joined together to form a frame. Flange connector 42 contains a plurality of flanges 47 that extend out from the perimeter of the connector. Flange 47 has a hollow center and acts as a female plug. Detachable support leg 46 has an end, contour plug 57 that plugs into flange 47 of connector 42. Contour plug 57 is the top horizontal portion of detachable support leg 46 that plugs directly into flange 47, going the majority of the way inside the flange.

The hollow center of flange 47 may vary in size and shape, comprising of shapes that have at least one side, such as a square, hexagon, octagon, cross, or flat, etc. Detachable support leg 46, for example, has contour plug 57 on one or both ends, that is of a particular shape and acts as the male plug, while flange 47 acts as the female plug. Contour plugs 57 are plugged into flanges 47, to form the frame. These shaped plugs, the flanges and contour plugs, prevent the detachable support leg from pivoting inside the flange and locks it in place at that position. Connector 42, as well as any other connector comprising of connectors 42, 43, and 44 may be made of any material, such as metal, metal wire, plastic, wood, etc. However, a resilient material comprising of but not limited to spring steel, may provide the best results. This strong but resilient material will enable flanges 47 and 55, or support holes 45 to firmly hold and contain contour plugs 56, to keep them in a sturdy and rigid position without slipping out of the flanges or support holes. When using spring steel or similar material, it would be best that the hollow center of the flanges have a slightly smaller inner diameter, than the diameter of the contour plug. When, for example, contour plug 57 is plugged into flange 47, flange 47 has to stretch to receive contour plug 57. This stretching creates a considerable resistance that keeps the plug from slipping out.

Flange 47, in this instance may be shaped from a flat piece of metal, for example, and formed into desired shape by wrapping or bending it. In this case, no welding is required because they are just formed into the desired shape. There are small slots or openings where the metal has to be cut to accommodate the shape. The combination of the shaped plugs, hexagonal, square, flat, octagonal, etc. and the resilient material will enable a solid and secure assembled frame. Having a shaped plug with an equal number of sides enable the detachable support legs to be plugged in from multiple directions, depending on the number of shaped sides. The innermost circle of this connector has an open center. Flange connector 42 also functions as a tea light holder, where outer rim extends higher than inner rim to contain tea light. The frame assembly can be used with various materials such as paper, fabric, beads, etc.

FIGS. 4A, 4B, and 4C are isometric views of alternative embodiments of frame assembly. These embodiments demonstrate various shaped detachable support legs 48, 49, and 50, respectively in order to create various shaped frames. These frame assemblies also enable the configuration of various shaped and sized frames for lanterns or paper lanterns by using one or more of connectors 42, 43, or 44 with detachable support legs 46, 48, 49, 50, 74, or 75. Detachable support legs 46, 48, 49, 50, 74, and 75 each have at least one end that may vary in shape, for example, flat, square, octagonal, etc. The shaped end is a contour plug that fits snugly into the hollow center of flange 47 and 55 or support holes 45, etc., of connector 42, 44, or 43, respectively. These various shaped frames can be encased with paper, tissue paper, rice paper, fabric, wire, beds etc.

FIGS. 4D and 4E are isometric and top views of flange connector 42 in a face down position. Flange connector 42 has a plurality of flanges 47, that any of detachable support legs 46, 48, 49, 50, 74, and 75 can be used with to form the frame. FIG. 4E illustrates flange connector 42 in a face down position where a tea light, if used, can be mounted or suspended on the underside of the connector, instead of on top. In this configuration, the flame is vented through the connector's open center.

FIG. 4F is the top view of flange connector 42 that illustrates the connector in a face up position where a tea light, if used, can sit on top of the connector and the connector acts as a tea light holder. The center of the connector is open. In this face up position, the connector has two rims, inner rim 84 and outer rim 85 and between them is conduit 83 which is concave. Outer rim 85 of flange connector 42 extends upward, a little higher than inner rim 84, to secure the tea light and keep it from sliding off. Flanges 47 are shaped like female plugs with hollow centers to receive detachable support legs. The hollow center of the flange is shaped to fit the contour plug end of the detachable support leg, such as contour plug 57. FIG. 4G is the top view of flange connector 42 with detachable support legs 46 plugged into flanges 47. This illustrates the connector in a face up position to demonstrate how any of the detachable support legs 46, 48, 49, 50, 74, and 75 are plugged into the flanges.

FIGS. 4H and 4I are isometric and top views of basic connector 43, which is an alternative embodiment of a connector with a plurality of support holes 45. Support holes 45 may vary in size and shape, such as flat, square, hexagonal, octagonal, cross, etc., and is used to connect and hold any of detachable support legs 46, 48, 49, 50, 74, and 75 together to form the frame. Basic connector 43 works in pretty much the same way as flange connector 42 does. Connector 43 is a little more versatile in that it has a multiplicity of holes in order to add more or use less detachable support legs 46, 48, 49, 50, 74, and 75, when desired.

FIG. 4J is the frontal view of frame assembly that demonstrates a tea light placed on top of flange connector 42 in the face up position, as seen in FIGS. 4F and 4G. Outer rim 85 of the connector extends higher than inner rim 84. This secures the tea light and keeps it from sliding off.

FIG. 4K is the frontal view of frame assembly that demonstrates a tea light suspended or mounted on the underside of connector 42. The tea light may be secured this way by placing the rim of a tea light with an aluminum cup, and magnet 52 inside of conduit 83 of the connector. When detachable support legs are plugged into flanges 47, the magnetic force draws them in and holds them all in place. Magnet 52 is a ring, while magnet 51 is a square disk. The magnets may vary in size and shape. Other methods to suspend the tea light on the underside of the connector may include criss-crossed wire pieces, wire mesh, etc., that support the bottom of the tea light and is held in place by any of the detachable support legs. A rubber band or frame belt 54 can be used to tighten the frame and secure the tea light in this configuration.

FIG. 4L is an alternative embodiment of frame assembly where three flange connector 56 has 3 flanges in order to create a triangular shaped frame, when desired. FIG. 4M is an isometric view of frame assembly being secured, although not required, with a rubber band. This embodiment may also be secured with magnet 52 which is concealed within the connector. If using detachable support legs 74, which contain notches 53, then frame belt 54 may be used.

FIG. 4N is an isometric view of an alternative embodiment for frame assembly using basic connector 43 and is comprised of detachable support legs 46. This embodiment may also be secured with magnet 52 which can be concealed within the connector. The magnet is placed between the inner and outer rim of this connector within the conduit area of the connector. This embodiment may be secured in the same manner in which frame assembly using connector 42 can be secured.

FIG. 4O is the top view of simple connector 44 which is an alternative embodiment of a connector with a plurality of flanges that have hollow centers that may vary in size and shape, such as flat, square, octagonal, etc., and is used to connect and hold detachable support legs 46, 48, 49, 50, 74, or 75 together to form the frame. FIG. 4P is the top view of simple connector 44 with detachable support legs 46 plugged into it. FIG. 4Q is an isometric view of an alternative embodiment of frame using simple connector 44 with detachable support legs 46 plugged into the flanges.

FIG. 4R contains detachable support legs 48, 49, and 75 that can also be used to form various shaped lantern frames. Detachable support members may come in additional shapes and sizes.

FIG. 4S is an exploded view of frame assembly containing flange connector 42, detachable support legs 46 and magnet 52. The arrows show detachable support legs 46 being plugged into flanges 47. The flanges act as female connectors and detachable support legs 46 act as male connectors. Flanges 47 would be snug enough to hold in detachable support legs 46 to keep them from sliding out, however; the frame assembly may also be secured by a magnet. Magnet 52 fits neatly inside of conduit 83 of flange connector 42. The force of the magnet draws the detachable support legs in to keep them from sliding out. The strength of the magnet may vary, but it would be strong enough to keep detachable support legs 46 from sliding out due to gravity. The magnet is not required but may be more desirable for those who want to eliminate visible components such as rubber bands or metal rings, etc., to secure detachable support legs 46. The magnet may have other practical purposes while in use, such as attaching other devices that attract to magnets that may be attached to or suspended from the frame.

FIG. 4T is an isometric view of an alternative embodiment of frame assembly using simple connector 44. Detachable support legs 46 are shaped to form an alternate embodiment of post 22 as seen in FIG. 1A, for mounting and staking the frame. This configuration will fit inside of stake head 27 of a stake or mount head 28 of a mounting device. Simple connector 44 is best to use when one wants to suspend an LED tea light in an inverted positions such as in FIG. 4Y. Simple connector 44 may also be a cheaper and lighter version of the other connectors 42 and 43.

FIG. 4U is an isometric view of frame assembly where smaller sized paper that cannot fit around the entire perimeter of the frame, is wrapped more than half way around the frame and is secured by clipping each end of the paper to detachable support legs 46 with clips. Clips may come in various materials such as plastic, metal, etc., but metal seems to render the best results because of its strength. Paper may be fastened to itself using various methods comprising of tape, adhesive glue dots, staples, clips, string, rubber bands, etc. FIG. 4V is an isometric view of frame assembly with paper wrapped around detachable support legs 46 and secured by a rubber band. The rubber band holds the paper securely to the frame. Paper can be secured with various methods comprising of tape, staples, clips, string, rubber bands, etc.

FIG. 4W is an isometric view of an alternative embodiment for frame assembly using basic connector 43, detachable support legs 74, and frame belt 54 that are assembled to form the frame. Detachable support members 74 contain belt notch 53, which is used to secure frame belt 54. Frame belt 54 slides down over frame and pops in to belt notch 53. The inner diameter of frame belt 54, being slightly smaller than the width of the frame, in addition to the slope of detachable support legs 46 creates a tension. This tension enables frame belt 54 to pop into belt notches 53, and be held securely in place.

FIG. 4X is a top view of simple connector 44 in a face up position with detachable support legs 46 plugged into flanges 55. This view illustrates how magnet 51 is placed on this connector and where detachable support legs 46 make contact with the magnet to hold them in place, if desired. The magnet is also useful in holding the tea light on top of the connector, where it won't slide off because the wick in the tea light is tethered to a piece of metal that attracts to magnets. When using an LED tea light, the battery in the LED light will also attract to the magnet, securing it in place. FIG. 4Y is an isometric view of an alternative embodiment for frame assembly using simple connector 44 with magnet 51 to hold the frame together. In FIG. 4Y, an LED tea light is suspended by the battery making contact with magnet 51 to direct the light downwards. This may be desired when the majority of the paper is below the tea light. The battery in the LED tea light will attract to magnet 51, suspending it from the connector.

FIGS. 5-15B

Additional Embodiments

FIG. 5 is an isometric view of frame embodiment, while in use with a stopper 30 and a removable tea light holder 31. Stopper 30 may vary in inner diameter. It has a plurality of stems that are welded together to form stopper 30. It also has a stem notch 90 that are used to contain tea light holder 31, to keep it from shifting. Tea light holder 31 has horizontal supports that enable it to rest on stopper 30, inside of stem notches 90, in a perpendicular manner. The preferred material for stopper 30 and tea light holder 31 is strong but thin metal wire. However, any suitable material that produces similar results will do.

FIG. 6 is an exploded view of stopper 30 and removable tea light holder 31.

FIG. 7 is an isometric view of an alternative frame embodiment that is shorter and smaller, to accommodate smaller paper sizes or craft materials. The typical smaller scrapbook paper sizes are 6"×6" and 8"×8" but come in other various sizes that may be used as well. Custom sized paper can be cut to desired sizes to fit the frame embodiment. It operates in a similar manner as frame embodiment in FIG. 5.

FIG. 8 demonstrates how standard sized scrapbook paper is used with the frame embodiment, as seen in FIG. 1. The paper, after being formed as a cylinder, is tightened and fastened, slid over the top of the frame, and adjusted and elevated at a desired level. Once a desired elevation is determined, the paper can be permanently fastened.

FIGS. 9A, 9B, 9C, 9D, and 9E demonstrate a plurality of cork toppers that are used to provide a frame for paper displays above a bottle or vase. Cork toppers are smaller in size and are proportionate to the size of a small bottle or vase. Cork toppers have a cork stake 32 that is inserted into the cork to suspend paper craft above bottle or vase. Cork toppers are preferably made of plastic because it is inexpensive and the stakes will not be visible; however, a material that produces similar results will do. Cork stake 32 is most preferably made of a strong plastic, or a material that will produce similar results. This can be accomplished with a mold, to produce the cork frames in plastic.

Figure 10A:
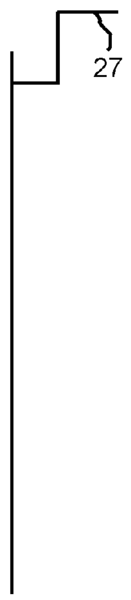
Figure 10B:
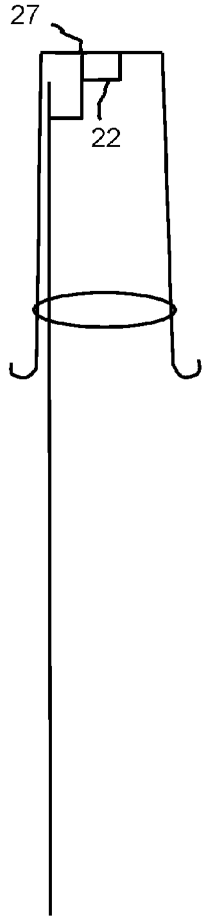
Figure 10C:

FIG. 10A contains the side view of an ordinary stake containing a stake head 27. FIG. 10B is a two-dimensional view demonstrating how stake in FIG. 10A and frame embodiment are used together. Stake head 27 is designed to hold and contain post 22 to stake or mount the frame and keep it rigid and from shifting. FIG. 10C illustrates the top view of a stake comprised of stake head 27. Stake head 27 has an open center surrounded by a plurality of stems that are welded together to form an open square enclosure. Stake head 27 has an inner diameter that is slightly larger than the outer diameter of post 22. This enables a snug and secure fit around post 22. A mount head 28 operates in pretty much the same way as stake head 27 and are extensions on a mounting device and stake, respectively. They are made of the same material as a typical mounting device and stake, which is typically metal.

Figure 11A:
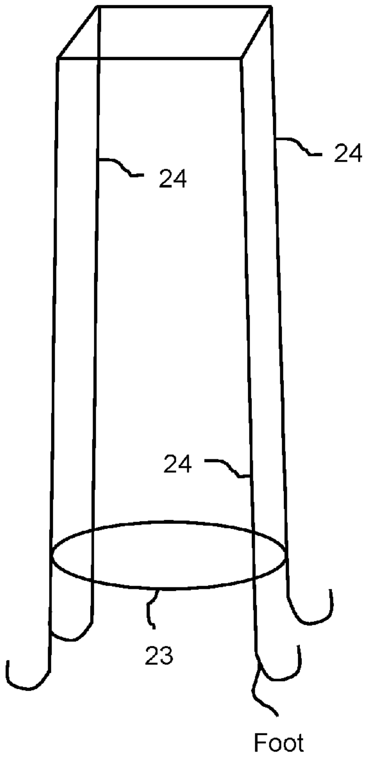
Figure 11B:
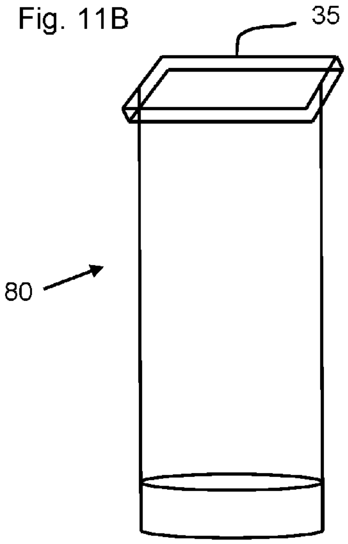

FIGS. 11A, 11B, 11C, and 11D are isometric views of an alternative frame embodiment and components. They are preferably made of metal and/or metal wire but any material that produces similar results is suitable. A cup case 81 is made of two opposing square shaped cases that are of identical size. One side fits face down over the top of frame embodiment, and the other side is face up in order to act as a container to hold objects. FIG. 11B is an isometric view of a vase holder attachment to be used with frame embodiment. Vase holder attachment would preferably be made of metal or any suitable material.

Figure 12A:
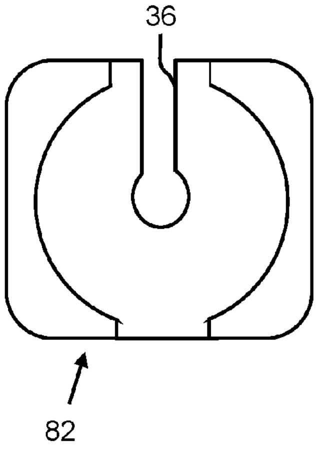
Figure 12B:
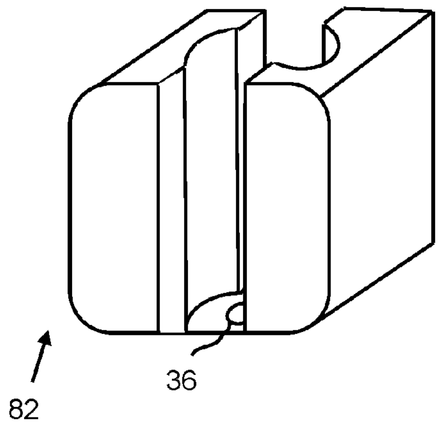

FIGS. 12A and 12B show top and isometric views of a lamp socket case 82 that secures an ordinary lamp socket inside of post 22 of frame embodiment. Lamp socket case 82 fills the empty space that surrounds the lamp socket. A cord slot 36 is an opening at the bottom of lamp socket case 82 that is used to constrain the lamp socket cord. Lamp socket case 82 would most preferably be made of a light rigid material, such as plastic. However, any suitable material that produces suitable results will do.

FIGS. 13A and 13B are isometric views of a cup plate 37, and frame embodiment in use together. Cup plate 37 would preferably be made of a slightly-lighter density of metal, than that of the frame, or a material that would produce similar results. Cup plate 37 rests on base 23 inside of frame embodiment in FIG. 13B and has a plurality of slots. The rim of cup plate 37 has a lip 38. Lip 38 folds over the edge of base 23 on frame embodiment to keep cup plate 37 in place.

FIGS. 14A, 14B, and 14C demonstrate variations of how standard sized scrapbook paper is used with the frame embodiment in FIG. 1 at various elevations on the frame in use with various sized vases.

Contour plug 57, as seen in FIG. 14D, may come in various shapes and is located on at least one end of the detachable support leg. It cold formed to achieve a particular shape, such as octagon, hexagon, square, flat, cross, etc. Contour plug 57 would preferably be made of a strong metal wire. The wire gauge may vary from very small to medium. FIGS. 14E, 14G, 14I, and 14K are front views of contour plug 57, illustrating the cold formed shaped ends. FIGS. 14F, 14H, 14J, and 14L are front views of flanges comprising of flange 47, flange 55, and support holes 45 to illustrate the shape of the corresponding flange that contour 57 plugs into.

FIGS. 15A and 15B illustrate the use of cork frames, as described in FIGS. 9A-9E, to suspend paper formed shades above a corked bottle or vase.

Operation 5-15B

FIG. 5 is an isometric view of frame embodiment while in use with stopper 30 and removable tea light holder 31. This embodiment enables the use of a tea light at various locations on the frame, other than in post 22. Stopper 30 slides down over the frame, until it is stopped by the resistance of the width of the frame and its inner diameter. The inner diameter of stopper 30 enables it to be elevated at a particular point on the frame. Stopper 30 provides one location on the frame that the tea light will be elevated. Stopper 30 may come in a variety of sizes. Tea light holder 31 is then placed onto stopper 30 perpendicularly, as demonstrated in FIG. 6. Tea light holder 31 has horizontal stems that have a smooth surface. If the frame is moved or shifted, the tea light holder will pivot in stem notch 90, keeping the tea light upright and from spilling.

FIG. 6 is an exploded view of stopper 30 and removable tea light holder 31.

FIG. 7 is an isometric view of an alternative frame embodiment that is shorter and smaller, to accommodate smaller paper sizes or craft materials. The typical smaller scrapbook paper sizes are 6"×6" and 8"×8" but come in other various sizes that may be used as well. Custom sized paper can be cut to desired sizes to fit the frame embodiment. It operates in a similar manner as frame embodiment in FIG. 5.

FIG. 8 demonstrates how standard sized scrapbook paper is used with the frame embodiment, as seen in FIG. 1. The paper, after being formed as a cylinder, is tightened and fastened with clips, slid over the top of the frame, and adjusted and elevated at a desired level. Once a desired elevation is determined, the paper can be permanently fastened with staples, grommets, etc. However, clips can be used for a less permanent fasten. The slight ascending slope of vertical support members 24 prohibits paper from sliding down below the desired level or elevation point. While on the frame, the paper can retain its cylindrical shape for style, if desired. For a rectangular shaped paper display, the cylinder formed paper can be creased at the corners along the vertical support members 24 to form a rectangular shape. The paper can be shaped to be rectangular, square, cylindrical, asymmetrical etc. It can be elevated, high or low on the frame, just by tightening the paper and fastening it to itself. The frame can be used with or without objects, such as vases, votives, decorative tea light holders, etc.

Figure 9A:
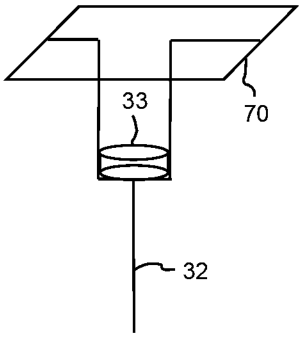
Figure 9B:
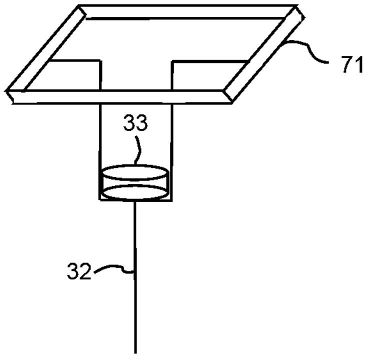
Figure 9D:
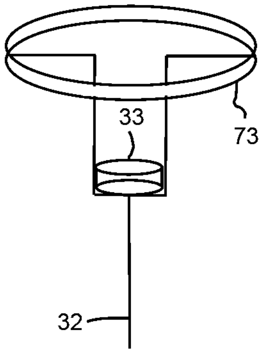
Figure 9C:
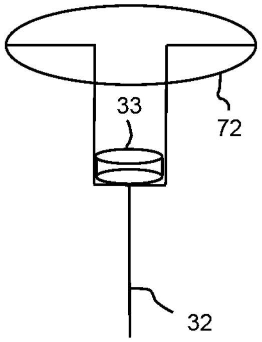
Figure 9E:
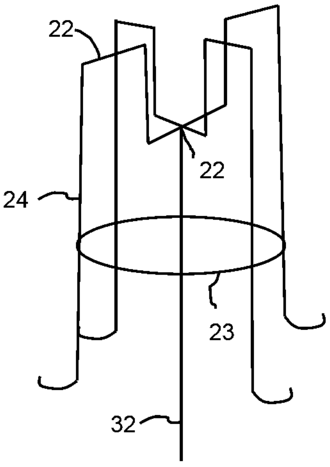

Cork toppers in FIGS. 9A, 9B, 9C, and 9D comprise of cork frames 70, 71, 72, and 73, which may vary in shape and size, and are used to display paper crafts above a corked vase or bottle. Cork stake 32 comprises a sharp pointed end that is inserted into a cork to suspend a paper shade, above a vase or bottle. To operate, paper or similar material is formed and fastened tightly, by using double sided tape when using cork frames in FIGS. 9A and 9C. The first edge of the paper is taped directly to cork frames 71 or 73, with a small piece of tape pulled tightly around the body of the cork frame, and is taped where it overlaps the first edge of paper. For cork frames 70 and 72, in FIGS. 9A and 9C, the paper can be fastened, with staples, clips, etc., to secure the paper. The paper is secured most efficiently by tightening, and then fastening the paper just above the top rim of cork frames 70 and 72. Cork stake 32 is then inserted into a corked vase or bottle, creating a faux lamp look, as seen in FIGS. 15A and 15B. The bottle or vase would resemble a lamp base, and the paper formed shade would resemble a lamp shade. Cork toppers in FIGS. 9A-9D contain a tea light cup 33 that an LED tea light can be placed into, for a real lamp effect. Cork frames 70, 71, 72, and 73 each may be wide or narrow as depicted. FIG. 9E demonstrates a cork topper shaped similarly to frame embodiment in FIG. 1, except that it is much smaller and lighter in weight. When using cork topper in FIG. 9E, the paper is secured in a similar fashion, as it would be for frame in FIG. 1. The cork stake 32 is then inserted into a cork for stability.

Figure 10D:
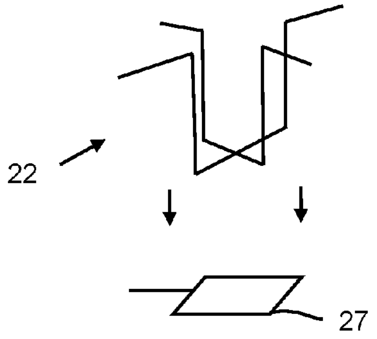
Figure 10E:
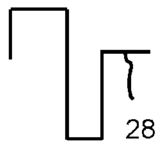
Figure 10F:

FIGS. 10A, 10B, 10C, 10D, 10E, and 10F demonstrate various components used to stake or mount the frame embodiment. FIG. 10A is the side view of an ordinary stake, comprised of steak head 27 that is used to hold and elevate frame embodiment above the ground. FIG. 10C is a top view of a stake that comprises stake head 27. As illustrated, stake head 27 has an open center. FIG. 10B is a two-dimensional view demonstrating how a stake, comprising of stake head 27, and frame embodiment are used together. Stake head 27 holds up the frame embodiment, via post 22. Post 22 slides and fits snugly into the open center of stake head 27, as seen in FIG. 10D, in order that the frame embodiment does not shift, twist or rock. A tea light or LED light may be placed in post 22 in this configuration. Mount head 28, as seen in FIG. 10F, operates in the same way as stake head 27, except that it is contained in a mounting device. With these components, the frame embodiment may be mounted on a wall or fence, via a mounting device, or elevated on a stake. Post 22 can be used for mounting or staking, even while in use with a tea light, LED light or lamp socket, without obstruction. FIG. 10E is the side view of an ordinary mounting device that contains mount head 28.

FIG. 11A is an isometric view of an alternative frame embodiment. This alternative embodiment does not contain post 22 and is open at the top. This embodiment enables the frame to contain a vase with flowers, etc., inside the body of the frame. The frame in FIG. 11A is constructed to be a self-standing and self-supported frame made of rigid metal wire. Although metal and/or metal wire is most desirable to use, any material that will produce similar results such as wood, plastic, etc. may also be suitable. A plurality of vertical support members 24 is connected to horizontal members to form the body of the frame and each vertical support member 24 has a foot at the bottom. The frame also contains a base 23. The vertical support members 24 forming the body of frame in FIG. 11A are sloped from top to bottom gradually extending outward from the top making the frame slightly narrower at the top and widens as it reaches base 23 in order that paper, when used, can be elevated at various positions on the frame. FIG. 11B is an isometric view of a vase holder attachment 80. Vase holder attachment 80 enables frame to hold a vase and such inside the body of the frame embodiment in FIG. 11A. The vase holder attachment 80 can be made of various materials such as metal, metal wire, etc.

Figure 11C:
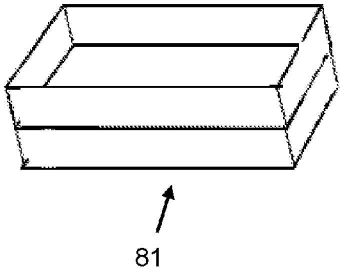

FIG. 11C is an isometric view of cup case 81 that sits on top of the frame. Cup case 81 has two opposing sides. One side faces down and is to be placed over the top of the frame and fits snugly on the frame. The other side faces up and the items such as a vase, tea light or votive holder, etc., is to be placed inside cup to contain the items as to keep them from sliding off of the frame during subtle movement.

The cup case can be made of any rigid material such as metal, plastic, wood etc. It is configured as two square shaped cases attached to the bottoms of each other. One side slides face down on the top of the frame like a lid, to prevent movement. The opposing side sits face up like a cup, to hold objects on top of the frame like a tea light or small vase.

Figure 11D:
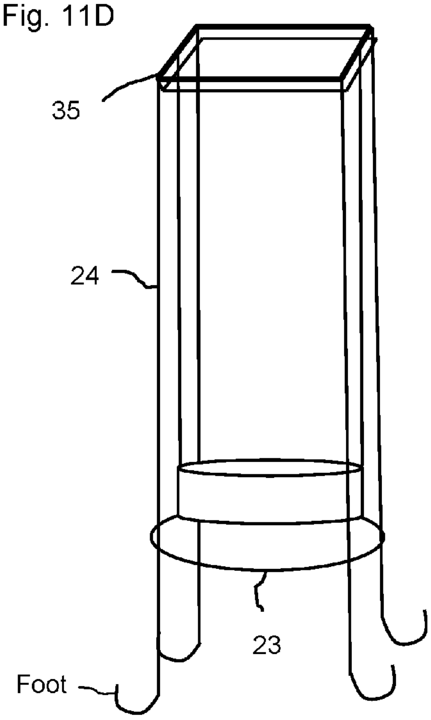

FIG. 11D is an isometric view of vase holder attachment 80 in use with alternative frame in FIG. 11A. Vase holder attachment 80 is slid onto frame from the top and is held in place by rim 35 of vase holder attachment 80. Rim 35 is shaped to fit the top edge or rim of frame in FIG. 11A and slips or snaps onto frame in FIG. 11A in a similar fashion that a coffee cup lid would fit onto a paper coffee cup.

Figure 12C:
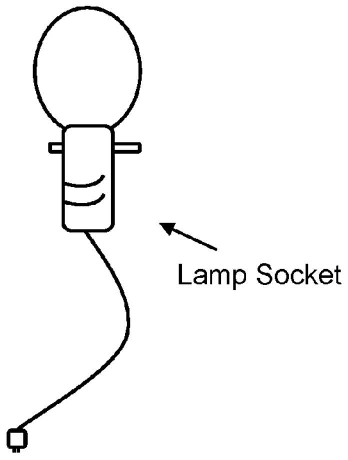
Figure 12D:
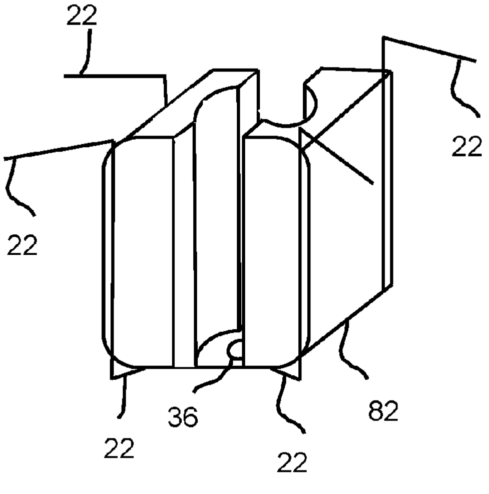

FIGS. 12A and 12B are top and isometric views of lamp socket case 82, which is used to secure a lamp socket inside of post 22 to use the frame as a lamp. The paper or other material would be used as the lamp shade. This embodiment ensures that the lamp socket fits snugly into post 22, without shifting or falling out. The lamp socket is placed into lamp socket case 82 where it fits snugly inside. The lamp socket is placed in and positioned with the light switch aligned with either open side of lamp socket case 82. The cord from the lamp socket is slid into cord slot 36 where it is contained and hangs within the body of the frame, and comes out at the bottom of the frame. Lamp socket case 82, containing lamp socket, is then placed into post 22 in an upright position as shown in FIG. 12B. Lamp socket case 82 can be made of various materials such as plastic, rubber, cardboard, metal, etc. Plastic may be the most economical material to use, although any suitable material will do. FIG. 12C depicts an ordinary lamp socket containing a light bulb. FIG. 12D is an isometric view of post 22 housing lamp socket case 82, as it would be in use. The lamp socket would be placed inside of lamp socket case 82.

FIG. 13A is an isometric view of cup plate 37. FIG. 13B demonstrates how cup plate 37 rests on base 23 inside of frame embodiment to hold objects such as small vases, votive holders, etc. Cup plate 37 has multiple slots that vertical support members 24 fit in to secure cup plate 37 in place. Small vases, votives, tea lights, etc. may sit on cup plate 37 to be displayed as part of the finished craft. The rim of cup plate 37 has a lip 38. Lip 38 folds over the edge of base 23 on frame embodiment to keep cup plate 37 in place. Cup plate 37 would preferably be made with the same or similar material that corresponding frame is made of which may be metal, metal wire, plastic, wood, etc. Cup plate 37 most preferably would be made to be of a slightly lighter density than that of the frame but strong enough to hold small weighted objects mentioned above. FIG. 13B is an isometric view of frame embodiment in use with cup plate 37.

FIG. 13C is an isometric view of circular sizer attachment in FIG. 3B, in use with frame embodiment using a large fastened sheet of paper. As depicted in the diagram, attachment bracket 34 slides over the body of frame embodiment, then the paper is secured around the frame, using double sided tape. The tension of the paper secured around frame body 39 and the double sided adhesive keeps it from sliding off.

FIGS. 14A, 14B, and 14C demonstrate how standard sized scrapbook paper is used with the frame embodiment in FIG. 1 at various elevations on the frame, in use with various sized vases. The paper, after being formed as a cylinder, is tightened and fastened with clips, slid over the top of the frame, and adjusted and elevated at a desired level. Once a desired elevation is determined, the paper can be permanently fastened to itself with staples, grommets, etc. The slight ascending slope of vertical support members 24, gradually extending outward from the top, prohibits paper from sliding down below the desired level or elevation point.

FIG. 14D illustrates a close-up of detachable support leg 46, comprising contour plug 57. As described previously, detachable support legs comprise of one or more contour plugs that are shaped in order to create a snug fit, once plugged into any of the connectors. This enables the assembled frame embodiment to be rigid and secure in the flanges and will prohibit support legs from shifting, pivoting, or falling out of the flanges. The shaped plugs and corresponding flanges, as shown, will prohibit movement. These shaped plugs will also enable the support legs to be positioned at various angles, by plugging them in at a different angle. For example, the square will enable the support leg to be rotated at 4 different positions, because there are 4 different sides. Flat, would only be two positions, up or down. The hexagon can rotate to six different positions, etc., creating a variety of looks for frame embodiment. This is quite useful for frames that will have the support legs encased in beads, or is using a soft material like tissue paper or fabric.

FIGS. 14F, 14H, 14J, and 14L are front views of flanges comprising of flange 47, flange 55, and support holes 45 to illustrate the shape of the corresponding flange that contour 57 plugs into, as seen in FIGS. 14E, 14G, 14I, and 14K.

FIGS. 15A and 15B illustrate the use of cork frames to suspend paper formed shades above a corked bottle or vase. FIG. 15A show the cork frame staked into the cork of a small vase. FIG. 15B demonstrates how the frame looks after covering it with paper. Using double sided tape, one edge of the paper is taped directly to circular cork frame 73. The other side is pulled around tightly, and then taped where it overlaps, to the other side of paper.

FIGS. 16A-16E

Third Embodiment

Figure 16A:
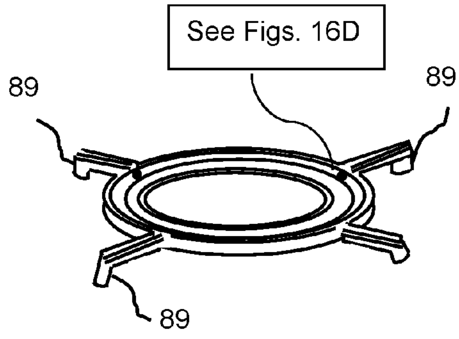
Figure 16B:
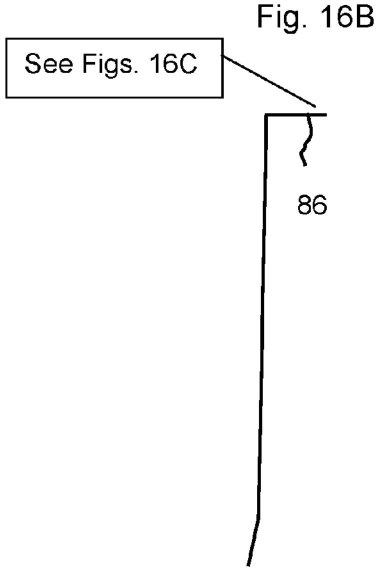
Figure 16C:
Figure 16D:

FIG. 16B is the side view of a detachable support leg 76. Detachable support leg 76 is an alternate detachable support leg embodiment that comprises a round plug 86. Support leg 76 may come in various shapes and sizes and may have a plurality of round plugs 86. Unlike contour plug 57 found in FIGS. 14E-14F, round plug 86 is cylindrical in shape, and is made to be used with an extender connector 87, as illustrated in FIG. 16A. FIG. 16C is a frontal view of round plug 86. Extender connector 87 comprises a plurality of flanges 88. Flange 88 has a hollow cylindrical center, as seen in FIG. 16D. Flange 88 comprises of a leg spout 89 that extends downward like a spout. Leg spout 89 has curvature like a spout, to restrict support leg 76 from pivoting. Detachable support leg 76 is preferably made of a thin-rigid metal wire material, but any suitable material will do that produces similar results. The surface is smooth and cylindrical. Extender connector 87 is preferably made of a thin resilient metal material in order that flange 88 holds support leg 76 snugly. Flange 76 has a cylindrical hollow center that is slightly smaller in diameter, than the diameter of round plug 86. When round plug 86 is plugged into the flange, flange 88 opens up to receive it, and maintains a tight fit around the support leg to keep it from slipping out.

Operation

16A-16E

Figure 16E:
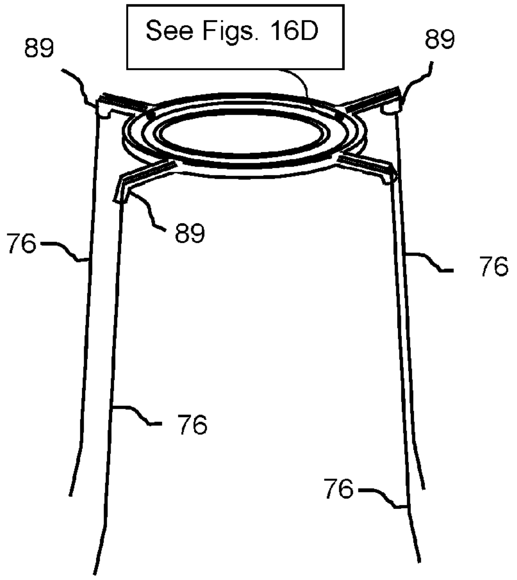

FIGS. 16A, 16B, 16C, 16D, and 16E illustrate a third embodiment of frame assembly. This embodiment comprises extender connector 87, and detachable support legs 76. To assemble, support legs 76 are plugged into flanges 88. Flange 88 widens to receive round plug 86 and holds it snug. Leg spout 89 contains support legs 76 to keep them from pivoting. Once all of the support legs are plugged into the flanges, the frame is ready to use. FIG. 16E illustrates how the assembled frame will appear and how support legs 76 are contained in leg spouts 89.

Advantages

From the description outlined, a number of advantages of some embodiments of my frame and frame assembly for lanterns and paper lanterns become clear:

(a) A reusable frame and frame assembly that enables the user to change out the paper repeatedly for an infinite variety of styles and uses, and does not require paper or similar material to be permanently adhered to the frame.

(b) A frame and frame assembly that enables paper to be positioned at various elevations on the frame.

(c) A frame and frame assembly that would enable one to create various crafts beyond a paper lantern while incorporating other trinkets within the body of the frame.

(d) A frame assembly that has interchangeable support members that are of various configurations to enable different shaped lanterns.

(e) A frame assembly that is configured to be mounted on a wall or staked in the ground.

(f) If an individual component is damaged or lost, that individual component may simply be replaced without having to replace the entire frame assembly.

(g) A frame support that gives handmade paper lanterns a more sophisticated look where the paper conforms to the edges of the frame creating a uniform and polished appearance.

(h) The frame and frame assembly are cost effective in that they can be used repeatedly for an infinite amount of events, just by using scrapbook paper, or any type of paper desired.

(i) The frame and frame assembly are super easy to assemble and can be set up in just a few short minutes.

Conclusion, Ramifications, and Scope

Accordingly, the reader will see that the frame and frame assembly of various embodiments can be used to create paper lanterns quickly, and inexpensively. Additionally, the frame and frame assembly gives handmade paper lanterns and crafts a more polished appearance that can be used in professional affairs such as weddings and corporate events. The frame and frame assembly enables paper to be elevated at countless points along the frame to create a variety and looks and styles.

The foregoing description of the embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

I claim:

1. A lantern comprising:

a plurality of substantially vertical rigid support members;

said vertical support members are connected to form a frame that supports a light;

the frame having an increasing first diameter or width so that said frame gradually extends outward from the top of the frame, wherein said frame is slightly smaller at the top;

said frame comprises a plurality of elevation points or locations along said vertical supports;

a stiff wrap surrounding the frame made of paper or wire;

said stiff wrap having a second diameter or width that is smaller than the increasing first diameter or width so that said stiff wrap is supported at various elevation points or locations on the frame by said increasing first diameter or width of said frame due to the difference in the first and second diameters or widths limiting vertical movement or slippage of the wrap beyond said preferred elevation points or locations; and wherein said frame is self-standing and self-supported.

2. The lantern in claim 1 further comprising a post having a plurality of horizontal and vertical members that connect at right angles to form an elongated open enclosure whereby a tea light can be contained securely with little room to shift.

3. The lantern in claim 1 wherein said vertical support members are rigid.

4. The lantern in claim 1, further comprising a post configured to connect the vertical support members.

5. The lantern in claim 1 wherein said stiff wrap is secured to said substantially vertical rigid support members by fasteners comprising of clips.

6. The lantern in claim 3 wherein said post is at the top of said frame whereby said stiff wrap can be elevated on the frame so that objects on said post can be contained within the body of said frame.

7. The lantern in claim 1 wherein said substantially vertical rigid support members each has a foot.

8. The lantern in claim 1 wherein said substantially vertical rigid support members are made of metal wire.

9. The lantern in claim 1 further comprising a post having one of a stake head and a mount head connected to a corresponding one of a stake and a mounting device, having a plurality of horizontal and vertical stems connected at right angles to form an open square enclosure, to contain said post and to keep it from shifting.

10. The lantern in claim 1 wherein said stiff wrap has an adjustable said diameter or width whereby the stiff wrap can be adjusted and elevated at various locations along said vertical support members.

11. The lantern in claim 1 wherein said substantially vertical rigid support members are substantially straight on portion of said frame where said stiff wrap is secured or fastened.

12. The lantern in claim 1 wherein said frame comprises four said substantially vertical rigid support members.

13. The lantern in claim 1 wherein said vertical movement or slippage of said stiff wrap is further restricted by friction between said increasing diameter or width of said frame and the inner diameter or width of said stiff wrap; and said inner diameter or width of the stiff wrap is smaller than the width or diameter of the frame at the elevation points or locations.

14. The lantern in claim 1 wherein said stiff wrap is fastened to itself.

15. The lantern in claim 1 wherein said substantially vertical rigid support members are cylindrical.

16. A lantern, comprising:

a plurality of rigid detachable support legs, and a means to join said detachable support legs to form a frame that supports a light;

said frame having an increasing first diameter or width so that said frame gradually extends outward from the top of the frame, wherein said frame is slightly smaller at the top;

said frame comprises a plurality of elevation points or locations along said support legs;

a stiff wrap surrounding the frame made of paper or wire; said stiff wrap having a second diameter or width that is smaller than the increasing first diameter or width so that said stiff wrap is fastened on the frame and is supported at various elevations on the frame by said increasing diameter or width of said frame, due to the difference in the first and second diameters or widths restricting vertical movement or slippage of said stiff wrap beyond said preferred elevation points or locations;

wherein said frame is self-standing and self-supported; and wherein said detachable support legs are substantially vertical with a slight slope.

17. The lantern in claim 16 wherein said means to join said detachable support legs is a connector.

18. The lantern in claim 16 wherein said detachable support legs include a contour plug to join said means to join, wherein said contour plug is elongated and has a particular shape selected from square, octagon, cross, hexagon, and flat.

19. The lantern in claim 17 wherein said connector is composed of a resilient material and comprises a plurality of at least one of flanges or support holes.

20. The lantern in claim 19 wherein said flanges comprises a hollow center and at least one side having a shape selected from square, hexagon, octagon, cross, and flat.

21. The lantern in claim 16 further comprising a means to secure and fasten said stiff wrap to said frame.

22. A lantern comprising:

a plurality of substantially vertical support members;

said vertical support members are connected to form a frame that supports a light;

the frame having an increasing first diameter or width so that said frame gradually extends outward from the top of the frame, wherein said frame is slightly smaller at the top;

said frame comprises a plurality of elevation points or locations along said vertical supports;

a stiff wrap surrounding the frame made of paper or wire;

said stiff wrap having a second diameter or width that is smaller than the increasing first diameter or width so that said stiff wrap is supported at various elevations on the frame by said increasing first diameter or width of said frame due to the difference in the first and second diameters or widths limiting vertical movement or slippage of the wrap beyond said preferred elevation points or location;

a vertical cork stake that is perpendicularly connected to the frame body and that plugs into a cork to suspend the frame body above the cork; and wherein said frame is self-standing and self-supported.

* * * * *

UNITED STATES PATENT AND TRADEMARK OFFICE

CERTIFICATE OF CORRECTION

PATENT NO. : 9,541,231 B1
APPLICATION NO. : 14/312638
DATED : January 10, 2017
INVENTOR(S) : Celena Misshola Owens It is certified that error appears in the above-identified patent and that said Letters Patent is hereby corrected as shown below:

In the Claims

Column 19, Line 65, cancel the text “rigid”
Column 20, Line 27, cancel the text “rigid”
Column 20, Line 34, cancel the text “rigid”
Column 20, Line 36, cancel the text “rigid”
Column 20, Line 49, cancel the text “rigid”
Column 20, Line 53, cancel the text “rigid”
Column 20, Line 63, cancel the text “rigid”

Signed and Sealed this
Twenty-seventh Day of June, 2017

Joseph Matal

Joseph Matal
*Performing the Functions and Duties of the*
*Under Secretary of Commerce for Intellectual Property and*
*Director of the United States Patent and Trademark Office*